(12) United States Patent  
Rosenflanz et al.

(10) Patent No.: US 7,141,522 B2
(45) Date of Patent: *Nov. 28, 2006

(54) CERAMICS COMPRISING $AL_2O_3$, $Y_2O_3$, $ZRO_2$ AND/OR $HFO_2$, AND $NB_2O_5$ AND/OR $TA_2O_5$ AND METHODS OF MAKING THE SAME

(75) Inventors: Anatoly Z. Rosenflanz, Maplewood, MN (US); Craig R. Schardt, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 281 days.

This patent is subject to a terminal disclaimer.

(21) Appl. No.: 10/666,098

(22) Filed: Sep. 18, 2003

(65) Prior Publication Data

US 2005/0065012 A1    Mar. 24, 2005

(51) Int. Cl.
*C03C 3/12* (2006.01)
*C03C 3/155* (2006.01)
*C03C 3/062* (2006.01)

(52) U.S. Cl. .......................... 501/41; 501/49; 501/50; 501/51; 501/52; 501/73; 501/77; 501/79; 385/141

(58) Field of Classification Search ............ 501/41–52, 501/73, 77–79, 10; 51/307, 309; 385/141
See application file for complete search history.

(56) References Cited

U.S. PATENT DOCUMENTS

| | | |
|---|---|---|
| 659,926 A | 10/1900 | Jacobs |
| 906,339 A | 12/1908 | Tone |
| 960,712 A | 6/1910 | Saunders |
| 1,037,999 A | 9/1912 | Saunders |
| 1,107,011 A | 8/1914 | Allen |
| 1,149,064 A | 8/1915 | Kalmus |
| 1,161,620 A | 11/1915 | Coulter |
| 1,192,709 A | 7/1916 | Tone |
| 1,240,490 A | 9/1917 | Saunders et al. |
| 1,247,337 A | 11/1917 | Saunders et al. |
| 1,257,356 A | 2/1918 | Hutchins |
| 1,263,708 A | 4/1918 | Saunders et al. |
| 1,263,709 A | 4/1918 | Saunders et al. |
| 1,263,710 A | 4/1918 | Saunders et al. |
| 1,268,532 A | 6/1918 | Allen |
| 1,268,533 A | 6/1918 | Allen |
| 1,314,061 A | 8/1919 | Harrison |
| 1,339,344 A | 5/1920 | Hutchins |
| 1,402,714 A | 1/1922 | Brockbank |
| 1,448,586 A | 3/1923 | Allen |
| 1,910,444 A | 5/1933 | Nicholson |
| 2,000,857 A | 5/1935 | Masin |
| 2,206,081 A * | 7/1940 | Eberlin ............... 501/51 |
| 2,424,645 A | 7/1947 | Baumann, Jr. et al. |
| 2,618,567 A | 11/1952 | Comstock, III |
| 2,805,166 A | 9/1957 | Loffler |
| 2,958,593 A | 11/1960 | Hoover et al. |
| 2,961,296 A | 11/1960 | Fenerty |
| 3,041,156 A | 6/1962 | Rowse et al. |
| 3,141,747 A | 7/1964 | Marshall |
| 3,174,871 A | 3/1965 | Geffcken et al. |
| 3,181,939 A | 5/1965 | Marshall et al. |
| 3,216,794 A | 11/1965 | Roschuk |
| 3,377,660 A | 4/1968 | Marshall et al. |
| 3,498,769 A | 3/1970 | Coes, Jr. |
| 3,560,780 A | 2/1971 | Connelly |
| 3,625,717 A | 12/1971 | Grubba et al. |
| 3,635,739 A | 1/1972 | Macdowell et al. |
| 3,637,361 A | 1/1972 | Kita et al. |
| 3,646,713 A | 3/1972 | Marshall et al. |
| 3,650,780 A * | 3/1972 | Connelly ................ 501/51 |
| 3,714,059 A | 1/1973 | Shaw et al. |
| 3,717,583 A | 2/1973 | Shaw et al. |
| 3,726,621 A | 4/1973 | Cichy |
| 3,754,978 A * | 8/1973 | Elmer et al. ............ 428/335 |
| 3,781,172 A | 12/1973 | Pett et al. |
| 3,792,553 A | 2/1974 | Schleifer et al. |
| 3,859,407 A | 1/1975 | Blanding et al. |
| 3,881,282 A | 5/1975 | Watson |
| 3,891,408 A | 6/1975 | Rowse et al. |
| 3,893,826 A | 7/1975 | Quinan et al. |
| 3,916,584 A | 11/1975 | Howard et al. |
| 3,926,603 A | 12/1975 | Plesslinger et al. |
| 3,928,515 A | 12/1975 | Richmond et al. |
| 3,940,276 A | 2/1976 | Wilson |
| 3,947,281 A | 3/1976 | Bacon |
| 3,973,977 A | 8/1976 | Wilson |
| 3,996,702 A | 12/1976 | Leahy |
| 4,014,122 A | 3/1977 | Woods |
| 4,035,162 A | 7/1977 | Brothers et al. |
| 4,049,397 A | 9/1977 | Bockstiegel et al. |
| 4,059,417 A | 11/1977 | Ilmaier et al. |
| 4,070,796 A | 1/1978 | Scott |
| 4,073,096 A | 2/1978 | Ueltz et al. |
| 4,111,668 A | 9/1978 | Walker et al. |

(Continued)

FOREIGN PATENT DOCUMENTS

AT           333146            10/1976

(Continued)

OTHER PUBLICATIONS

Aguilar, E.A., "Processing and crystallization of rapidly solidified $Al_2O_3$-$Y_2O_3$ fibres", British Ceramic Transactions, 2000, vol. 99, No. 6, pp. 256-259.

(Continued)

*Primary Examiner*—Karl Group
(74) *Attorney, Agent, or Firm*—Gregory D. Allen

(57) ABSTRACT

Ceramics comprising (i) at least one of $Nb_2O_5$ or $Ta_2O_5$ and (ii) at least two of (a) $Al_2O_3$, (b) $Y_2O_3$, or (c) at least one of $ZrO_2$ or $HfO_2$. Embodiments of ceramics according to the present invention can be made, formed as, or converted into optical waveguides, glass beads, articles (e.g., plates), fibers, particles (e.g., abrasive particles), and thin coatings.

41 Claims, 3 Drawing Sheets

U.S. PATENT DOCUMENTS

| | | | |
|---|---|---|---|
| 4,111,707 A | 9/1978 | Komorita et al. | |
| 4,126,429 A | 11/1978 | Watson | |
| 4,140,494 A | 2/1979 | Coes, Jr. | |
| 4,157,898 A | 6/1979 | Walker et al. | |
| 4,182,437 A | 1/1980 | Roberts et al. | |
| 4,194,887 A | 3/1980 | Ueltz et al. | |
| 4,217,264 A | 8/1980 | Mabie et al. | |
| 4,218,253 A | 8/1980 | Dworak et al. | |
| 4,238,213 A | 12/1980 | Pallo et al. | |
| 4,261,706 A | 4/1981 | Blanding et al. | |
| 4,311,489 A | 1/1982 | Kressner | |
| 4,314,827 A | 2/1982 | Leitheiser et al. | |
| 4,316,964 A | 2/1982 | Lange | |
| 4,341,533 A | 7/1982 | Daire et al. | |
| RE31,128 E | 1/1983 | Walker et al. | |
| 4,405,545 A | 9/1983 | Septier et al. | |
| 4,415,510 A | 11/1983 | Richmond | |
| 4,439,845 A | 3/1984 | Geohegan, Jr. et al. | |
| 4,457,767 A | 7/1984 | Poon et al. | |
| 4,467,767 A | 8/1984 | Kampichler et al. | |
| 4,472,511 A * | 9/1984 | Mennemann et al. | 501/78 |
| RE31,725 E | 11/1984 | Walker et al. | |
| 4,489,022 A | 12/1984 | Robyn et al. | |
| 4,518,397 A | 5/1985 | Leitheiser et al. | |
| 4,530,909 A | 7/1985 | Makishima et al. | |
| 4,543,107 A | 9/1985 | Rue | |
| 4,552,199 A | 11/1985 | Onoyama et al. | |
| 4,584,279 A | 4/1986 | Grabowski et al. | |
| 4,588,419 A | 5/1986 | Caul et al. | |
| 4,595,663 A | 6/1986 | Krohn et al. | |
| 4,623,364 A | 11/1986 | Cottringer et al. | |
| 4,652,275 A | 3/1987 | Bloecher et al. | |
| 4,705,656 A | 11/1987 | Onoyama et al. | |
| 4,734,104 A | 3/1988 | Broberg | |
| 4,737,163 A | 4/1988 | Larkey | |
| 4,741,743 A | 5/1988 | Narayanan et al. | |
| 4,744,802 A | 5/1988 | Schwabel | |
| 4,751,137 A | 6/1988 | Halg et al. | |
| 4,752,459 A | 6/1988 | Pepper | |
| 4,756,746 A | 7/1988 | Kemp, Jr. et al. | |
| 4,757,036 A | 7/1988 | Kaar et al. | |
| 4,762,677 A | 8/1988 | Dolgin | |
| 4,770,671 A | 9/1988 | Monroe et al. | |
| 4,772,511 A | 9/1988 | Wood et al. | |
| 4,780,268 A | 10/1988 | Papsi et al. | |
| 4,789,501 A | 12/1988 | Day et al. | |
| 4,799,939 A | 1/1989 | Bloecher et al. | |
| 4,800,685 A | 1/1989 | Haynes, Jr. | |
| 4,812,422 A | 3/1989 | Yuhaku et al. | |
| 4,829,031 A | 5/1989 | Roy et al. | |
| 4,881,951 A | 11/1989 | Wood et al. | |
| 4,898,587 A | 2/1990 | Mera | |
| 4,898,597 A | 2/1990 | Hay et al. | |
| 4,950,294 A | 8/1990 | Hakamatsuka | |
| 4,960,441 A | 10/1990 | Pellow et al. | |
| 4,997,461 A | 3/1991 | Markhoff-Matheny et al. | |
| 5,007,943 A | 4/1991 | Kelly et al. | |
| 5,009,675 A | 4/1991 | Kunz et al. | |
| 5,009,676 A | 4/1991 | Rue et al. | |
| 5,011,508 A | 4/1991 | Wald et al. | |
| 5,013,696 A | 5/1991 | Greskovich et al. | |
| 5,023,212 A | 6/1991 | Dubots et al. | |
| 5,038,453 A | 8/1991 | Kurita et al. | |
| 5,042,991 A | 8/1991 | Kunz et al. | |
| 5,057,018 A | 10/1991 | Bowen | |
| 5,071,801 A | 12/1991 | Bedard et al. | |
| 5,085,671 A | 2/1992 | Martin et al. | |
| 5,090,968 A | 2/1992 | Pellow | |
| 5,094,672 A | 3/1992 | Giles, Jr. et al. | |
| 5,104,319 A | 4/1992 | Evans et al. | |
| 5,110,332 A | 5/1992 | Isaksson | |
| 5,118,326 A | 6/1992 | Lee et al. | |
| 5,122,176 A | 6/1992 | Goettler | |
| 5,131,926 A | 7/1992 | Rostoker et al. | |
| 5,139,978 A | 8/1992 | Wood | |
| 5,143,522 A | 9/1992 | Gibson et al. | |
| 5,152,917 A | 10/1992 | Pieper et al. | |
| 5,164,348 A | 11/1992 | Wood | |
| 5,185,299 A | 2/1993 | Wood et al. | |
| 5,194,072 A | 3/1993 | Rue et al. | |
| 5,201,916 A | 4/1993 | Berg et al. | |
| 5,203,884 A | 4/1993 | Buchanan et al. | |
| 5,203,886 A | 4/1993 | Sheldon et al. | |
| 5,213,591 A | 5/1993 | Celikkaya et al. | |
| 5,215,563 A | 6/1993 | LaCourse et al. | |
| 5,227,104 A | 7/1993 | Bauer | |
| 5,248,318 A | 9/1993 | Tamamaki et al. | |
| 5,259,147 A | 11/1993 | Falz et al. | |
| 5,273,566 A | 12/1993 | Balcar et al. | |
| 5,282,875 A | 2/1994 | Wood et al. | |
| 5,312,789 A | 5/1994 | Wood | |
| 5,336,280 A | 8/1994 | Dubots et al. | |
| 5,352,254 A | 10/1994 | Celikkaya | |
| 5,366,523 A | 11/1994 | Rowenhorst et al. | |
| 5,372,620 A | 12/1994 | Rowse et al. | |
| 5,376,470 A | 12/1994 | Sprouse | |
| 5,378,251 A | 1/1995 | Culler et al. | |
| 5,378,662 A | 1/1995 | Tsuyuki | |
| 5,395,407 A | 3/1995 | Cottringer et al. | |
| 5,413,974 A | 5/1995 | Yokoyama et al. | |
| 5,417,726 A | 5/1995 | Stout et al. | |
| 5,427,595 A | 6/1995 | Pihl et al. | |
| 5,429,647 A | 7/1995 | Larmie | |
| 5,431,704 A | 7/1995 | Tamamaki et al. | |
| 5,436,063 A | 7/1995 | Follett et al. | |
| 5,443,906 A | 8/1995 | Pihl et al. | |
| 5,449,389 A | 9/1995 | Yoshizumi et al. | |
| 5,484,752 A | 1/1996 | Waku et al. | |
| 5,496,386 A | 3/1996 | Broberg et al. | |
| 5,498,269 A | 3/1996 | Larmie | |
| 5,516,348 A | 5/1996 | Conwell et al. | |
| 5,520,711 A | 5/1996 | Helmin | |
| 5,534,843 A | 7/1996 | Tsunoda et al. | |
| 5,547,479 A | 8/1996 | Conwell et al. | |
| 5,549,962 A | 8/1996 | Holmes et al. | |
| 5,551,963 A | 9/1996 | Larmie | |
| 5,552,213 A | 9/1996 | Eschner | |
| 5,569,547 A | 10/1996 | Waku et al. | |
| 5,593,467 A | 1/1997 | Monroe | |
| 5,605,870 A | 2/1997 | Strom-Olsen et al. | |
| 5,609,706 A | 3/1997 | Benedict et al. | |
| 5,611,829 A | 3/1997 | Monroe et al. | |
| 5,641,469 A | 6/1997 | Garg et al. | |
| 5,645,619 A | 7/1997 | Erickson et al. | |
| 5,651,925 A | 7/1997 | Ashley et al. | |
| 5,653,775 A | 8/1997 | Plovnick et al. | |
| 5,665,127 A | 9/1997 | Moltgen et al. | |
| 5,679,067 A | 10/1997 | Johnson et al. | |
| 5,682,082 A | 10/1997 | Wei et al. | |
| 5,693,239 A | 12/1997 | Wang et al. | |
| 5,721,188 A | 2/1998 | Sung et al. | |
| 5,725,162 A | 3/1998 | Garg et al. | |
| 5,733,178 A | 3/1998 | Ohishi | |
| 5,733,564 A | 3/1998 | Lehtinen | |
| 5,738,696 A | 4/1998 | Wu | |
| 5,747,397 A | 5/1998 | McPherson et al. | |
| 5,763,345 A | 6/1998 | Ohshima et al. | |
| 5,782,940 A | 7/1998 | Jayan et al. | |
| 5,804,513 A | 9/1998 | Sakatani et al. | |
| 5,847,865 A | 12/1998 | Gopinath et al. | |
| 5,856,254 A | 1/1999 | Feige et al. | |
| 5,863,308 A | 1/1999 | Qi et al. | |
| 5,876,470 A | 3/1999 | Abrahamson | |
| 5,902,763 A | 5/1999 | Waku et al. | |

| | | | | | | |
|---|---|---|---|---|---|---|
| 5,903,951 A | 5/1999 | Ionta et al. | | EP | 0 227 374 | 7/1987 |
| 5,952,256 A | 9/1999 | Morishita et al. | | EP | 0 236 507 | 9/1987 |
| 5,954,844 A | 9/1999 | Law et al. | | EP | 0 247 838 | 7/1988 |
| 5,961,674 A | 10/1999 | Gagliardi et al. | | EP | 0 291 029 A1 | 11/1988 |
| 5,975,988 A | 11/1999 | Christianson | | EP | 0 408 771 A1 | 1/1991 |
| 5,976,274 A | 11/1999 | Inoue et al. | | EP | 0 469 271 | 2/1992 |
| 5,981,413 A | 11/1999 | Hale | | EP | 0 480 678 A1 | 4/1992 |
| 5,981,415 A | 11/1999 | Waku et al. | | EP | 0 494 638 | 7/1992 |
| 6,045,093 A | 4/2000 | Zheng | | EP | 0 495 536 A2 | 7/1992 |
| 6,053,956 A | 4/2000 | Wood | | EP | 0 579 281 A1 | 1/1994 |
| 6,123,743 A | 9/2000 | Carman et al. | | EP | 0 601 453 A2 | 6/1994 |
| 6,128,430 A | 10/2000 | Chu et al. | | EP | 0 647 601 A1 | 4/1995 |
| 6,146,244 A | 11/2000 | Atsugi et al. | | EP | 0 666 238 B1 | 8/1995 |
| 6,214,429 B1 | 4/2001 | Zou et al. | | EP | 0 666 239 B1 | 8/1995 |
| 6,245,700 B1 | 6/2001 | Budd et al. | | EP | 0 709 347 | 5/1996 |
| 6,251,813 B1 | 6/2001 | Sato | | EP | 0 722 919 A1 | 7/1996 |
| 6,254,981 B1 | 7/2001 | Castle | | EP | 0 291 029 B2 | 11/1996 |
| 6,268,303 B1* | 7/2001 | Aitken et al. ............... 501/63 | | FR | 1547 989 | 10/1968 |
| 6,277,161 B1 | 8/2001 | Castro et al. | | FR | 2 118 026 | 7/1972 |
| 6,287,353 B1 | 9/2001 | Celikkaya | | FR | 2538370 | 6/1984 |
| 6,306,926 B1 | 10/2001 | Bretscher et al. | | FR | 2 609 708 | 7/1988 |
| 6,335,083 B1 | 1/2002 | Kasai et al. | | GB | 793503 | 4/1958 |
| 6,361,414 B1 | 3/2002 | Ravkin et al. | | GB | 1005338 | 9/1965 |
| 6,362,119 B1 | 3/2002 | Chiba | | GB | 1 121 875 | 7/1968 |
| 6,447,937 B1 | 9/2002 | Murakawa et al. | | GB | 1 260 933 A | 1/1972 |
| 6,451,077 B1 | 9/2002 | Rosenflanz | | GB | 2 116 992 | 10/1983 |
| 6,454,822 B1 | 9/2002 | Rosenflanz | | GB | 2 377 438 A | 1/2003 |
| 6,458,731 B1 | 10/2002 | Rosenflanz | | JP | 50025608 | 3/1975 |
| 6,461,988 B1 | 10/2002 | Budd et al. | | JP | 59 22 7726 A | 12/1984 |
| 6,469,825 B1 | 10/2002 | Digonnet et al. | | JP | 60221338 | 11/1985 |
| 6,482,758 B1* | 11/2002 | Weber et al. ............... 501/41 | | JP | 61099665 | 5/1986 |
| 6,482,761 B1 | 11/2002 | Watanabe et al. | | JP | 62-003041 | 1/1987 |
| 6,484,539 B1 | 11/2002 | Nordine et al. | | JP | 63-156024 | 6/1988 |
| 6,490,081 B1 | 12/2002 | Feillens et al. | | JP | 3-113428 | 5/1991 |
| 6,511,739 B1 | 1/2003 | Kasai et al. | | JP | 4-119941 | 4/1992 |
| 6,514,892 B1 | 2/2003 | Kasai et al. | | JP | 05-085821 | 4/1993 |
| 6,521,004 B1 | 2/2003 | Culler et al. | | JP | 5-226733 | 9/1993 |
| 6,582,488 B1 | 6/2003 | Rosenflanz | | JP | 06 040765 A | 2/1994 |
| 6,583,080 B1 | 6/2003 | Rosenflanz | | JP | 06-171974 | 6/1994 |
| 6,589,305 B1 | 7/2003 | Rosenflanz | | JP | 63-303821 | 12/1998 |
| 6,592,640 B1 | 7/2003 | Rosenflanz et al. | | JP | 11-189926 | 7/1999 |
| 6,596,041 B1 | 7/2003 | Rosenflanz | | JP | 200045128 A | 2/2000 |
| 6,607,570 B1 | 8/2003 | Rosenflanz et al. | | JP | 200045129 A | 2/2000 |
| 6,620,214 B1 | 9/2003 | McArdle et al. | | JP | 2001294480 | 10/2001 |
| 6,666,750 B1 | 12/2003 | Rosenflanz | | JP | 2003-94414 | 4/2003 |
| 6,669,749 B1 | 12/2003 | Rosenflanz et al. | | KR | 9601009 | 4/1993 |
| 6,706,083 B1 | 3/2004 | Rosenflanz | | RU | 1455569 | 10/1996 |
| 6,749,653 B1 | 6/2004 | Castro et al. | | WO | WO 94/14722 | 7/1994 |
| 6,818,578 B1* | 11/2004 | Tachiwama ............... 501/78 | | WO | WO 97/16385 | 5/1997 |
| 2001/0030811 A1 | 10/2001 | Kasai et al. | | WO | WO 97/25284 | 7/1997 |
| 2002/0066233 A1 | 6/2002 | McArdle et al. | | WO | WO 00/34201 | 6/2000 |
| 2002/0160694 A1 | 10/2002 | Wood et al. | | WO | WO 01/16047 A2 | 3/2001 |
| 2003/0040423 A1 | 2/2003 | Harada et al. | | WO | WO 01/23321 A1 | 4/2001 |
| 2003/0110706 A1 | 6/2003 | Rosenflanz | | WO | WO 01/23323 A1 | 4/2001 |
| 2003/0110707 A1 | 6/2003 | Rosenflanz et al. | | WO | WO 01/27046 A1 | 4/2001 |
| 2003/0110708 A1 | 6/2003 | Rosenflanz | | WO | WO 01/56946 A | 8/2001 |
| 2003/0110709 A1 | 6/2003 | Rosenflanz et al. | | WO | WO 01/56947 A | 8/2001 |
| 2003/0115805 A1 | 6/2003 | Rosenflanz et al. | | WO | WO 01/56949 A | 8/2001 |
| 2003/0126802 A1 | 7/2003 | Rosenflanz | | WO | WO 01/56950 A | 8/2001 |
| 2003/0126803 A1 | 7/2003 | Rosenflanz | | WO | WO 02/08146 A | 1/2002 |
| 2003/0126804 A1* | 7/2003 | Rosenflanz et al. ........... 51/307 | | WO | WO 03/001776 A1 | 1/2003 |
| 2003/0145525 A1 | 8/2003 | Rosenflanz | | | | |
| 2004/0020245 A1 | 2/2004 | Rosenflanz et al. | | | | |
| 2004/0023078 A1 | 2/2004 | Rosenflanz et al. | | | | |
| 2004/0148868 A1 | 8/2004 | Anderson et al. | | | | |
| 2005/0075233 A1 | 4/2005 | Weber et al. | | | | |

FOREIGN PATENT DOCUMENTS

| | | |
|---|---|---|
| DE | 20 34 011 | 7/1970 |
| DE | 134 638 A | 3/1979 |
| DE | 141 420 | 4/1980 |
| EP | 0 200 487 | 11/1986 |

OTHER PUBLICATIONS

Brewer, Luke N. et al., "Interface modification for increased fracture toughness in reaction-formed yttrium aluminum garnet/alumina eutectic composites," 1999, vol. 14, No. 10, pp. 3907-3912.

Brockway et al. "Rapid Solidification of Ceramics a Technology Assessment", *Metals and Ceramics Information Center*, MCIC Report, Jan. 1984 MCIC 84-49.

Chen, Zan-Hwey et al., "Microstructures of laser-treated $Al_2O_3$-$ZrO_2$-$CeO_2$ composites," *Materials Science & Engineering A*

(*Structural Materials: Properties, Microstructure and Processing*), 1995, vol. A196, No. 1-2, pp. 253-260.
"China: Oversupply Puts Rare Earths Projects On Hold", Industrial Minerals, Aug. 1997, 1 page.
"China's Rare Earth Export Quota Set at 45,000 Tons", Dow Jones Interactive Internet Printout on Jun. 20, 2001 for web address "http://ptg.djnr.com/ccroot/asp/publib/story.asp"; Asia Pulse, Jan. 9, 2001, 1 page.
"China's Rare Earth Industry In the Doldrums", Dow Jones Interactive Internet Printout on Jun. 20, 2001, for web address "http://ptg.djnr.com/ccroot/asp/publib/story.asp"; Asia Pulse, Jan. 28, 1999, 2 pages.
"China Rare Earth Information", China Rare Earth Information Center, vol. 6, No. 4, Aug. 2000, 3 pages.
Coutures et al., "Production and Studies of Alumina Based Refractory Glass," *Mat. Res. Bull.*, vol. 10, No. 6, 1975, pp. 539-546.
Dialog © file 319: Chem Bus NewsBase © 2001 Royal Soc Chemistry. Abstract for "China: Oversupply Puts Rare Earths Projects On Hold", Industrial Minerals n 359, p. 10.
"ELEMENTS: China to Impose Quotas on Rare Earth Exports", Dow Jones Interactive Internet Printout on Jun. 20, 2001 for web address "http://ptg.djnr.com/ccroot/asp/publib/story.asp"; Chemical Business NewsBase, Feb. 4, 1999, 1 page.
Figs. 311, 346, 350, 356-56, 373, and 716, *Phase Diagrams For Ceramists*, The American Ceramic Society, 1964, pp. 122, 136, 138, 140, 144, 248.
Figs. 2340-44, 2363, 2370, 2374-75, 2382-83, 2385, 2387, 2390, and 2392, *Phase Diagrams For Ceramists, 1969 Supplement*, The American Ceramic Society, 1969, pp. 95-96, 100, 102-103, 105-108.
Figs. 4366-71, 4377-78, 4404-05, 4417, 4426, 4430, 4433, 4437, 4440, 4444, 4457, 4572, and 4602, *Phase Diagrams For Ceramists, 1975 Supplement*, The American Ceramic Society, 1975, pp. 130-132, 135-136, 147, 152, 157, 159-160, 163-164, 166, 172-173, 238, 257.
Figs. 5042, 5211, 5217, 5224, 5228, 5232, 5237, 5239, 5241, 5245, 5251, 5257, 5418, and 5437, *Phase Diagrams For Ceramists*, vol. IV, The American Ceramic Society, 1981, pp. 29, 125, 127, 129-131, 133, 135-137, 139, 141, 143, 220, 228.
Fig. 6464, *Phase Diagrams For Ceramists*, vol. VI, The American Ceramic Society, 1981, p. 162.
Figs. 9262, and 9264, *Phase Diagrams For Ceramists*, vol. XI, Oxides, The American Ceramic Society, 1995, pp. 105-106.
Harris et al., "Durable 3-5 μm Transmitting Infrared Window Materials," Infrared Physics & Technology 39, 1998, pp. 185-201.
Hedrick, J., "Rare-Earth Metals", pp. 61.1-61.6, 1997.
Hedrick, J., "Rare-Earth Metal Prices in the USA ca. 1960 to 1994", J. Alloys and Compounds, 1997, pp. 471-481.
Hrovat et al., "Preliminary data on subsolidus phase equilibria in the $La_2O_3$-$Al_2O_3$-$Mn_2O_3$ and $La_2O_3$-$Al_2O_3$-$Fe_2O_3$ systems", *Journal of Materials Science Letters*, vol. 14, 1995, pp. 265-267.
Imakoa, Minoru et al., "Refractive Index and Abbe's Number of Glass of Lanthanum Borate System", Journal of Ceramic Assoc. Japan, vol. 70, No. 5, (1962), pp. 115.
"In Asia", Dow Jones Interactive Internet Printout on Jun. 20, 2001 for web address "http://ptg.djnr.com/ccroot/asp/publib/story.asp"; Engineering & Mining Journal, Feb. 28, 2000, 4 pages.
Isobe, T. et al., "Microstructure and Thermal Stability of $Al_2O_3$/$Y_3Al_5O_{12}$ (YAG) Eutectic Composite Prepared by an Arc Discharge Method", J. Ceram. Soc. Jap., 109, [1], 2001, pp. 66-70, Abstract in English.
Kingery, W.D., Introduction to Ceramics, Second Edition, Chpt. III subchapter 8.8, Glass-Ceramic Materials, pp. 368-374, (1976).
Kokubo, Tadashi et al., "Infrared Transmission of ($R_2O$ or R'O)-($TiO_2$, $Nb_2O_5$ or $Ta_2O_5$)-$Al_2O_3$ Glasses", Journal of Non-Crystalline Solids 22 (1970) 125-134.
Kondrashov V I et al., "Opacified Glass "Decorit" Synthesis Directions", Steklo I Keramika 2001, No. 1, pp. 8-11. Title translated as "Aspects of Synthesis of Decorite Opacified Glass".
Krell, Andreas et al., "Advances in the Grinding Efficiency of Sintered Alumina Abrasives," *Journal of the American Ceramic Society*, 1996, vol. 79, No. 3, pp. 763-769.

Krokhin et al., "Synthesis of Y-Al Garnet", *Glass and Ceramics*, vol. 55, Nos. 5-6, 1998, pp. 151-152.
Lakiza et al., "The Liquidus Surface In The $Al_2O_3$-$ZrO_2$-$Y_2O_3$ Phase Diagram", *Powder Metallurgy and Metal Ceramics*, vol. 33, No. 11-12, 1994, pp. 595-597.
Lakiza et al., "Methods Of Investigation Of Properties Of Powder Materials, Interactions In The $Al_2O_3$-$ZrO_2$-$Y_2O_3$ System", *Powder Metallurgy and Metal Ceramics*, vol. 33, Nos. 9-10, 1994, pp. 486-490.
Lakiza et al., "Powder-Material Research Methods And Properties Polythermal Sections Of The $Al_2O_3$-$ZrO_2$-$Y_2O_3$ Phase Diagram", *Powder Metallurgy and Metal Ceramics*, vol. 34, No. 11-12, 1995, pp. 655-659.
Lakiza et al., "Solidus Surface And Phase Equilibria During The Solidification Of Alloys In The $Al_2O_3$-$ZrO_2$-$Y_2O_3$ System", *Powder Metallurgy and Metal Ceramics*, vol. 34, Nos. 1-2, 1995, pp. 64-67.
Lakiz and Lopato, "Metastable Phase Relationships In The System $Al_2O_3$-$ZrO_2$-$Y_2O_3$", *Powder Metallurgy and Metal Ceramics*, vol. 35, Nos. 11-12, 1996, pp. 621-626.
Mah, Tai-Il et al., "Processing, Microstructure, and Strength of Alumina-YAG Eutectic Polycrystals", J. Am. Ceram. Soc., 83, [8], 2000, pp. 2088-2090.
McKittrick, Joanna, et al., "Non-stoichiometry and defect structures in rapidly solidified MgO-$Al_2O_3$-$ZrO_2$ ternary eutectics," *Materials Science and Engineering* A231 (1997) 90-97.
McMillan, P.W., *Glass-Ceramics*, Academic Press, Inc., $2^{nd}$ Edition (1979).
"Phase Identification of $Al_2O_3$/$RE_3Al_5O_{12}$ and $Al_2O_3$/$REAlO_3$ (RE = Sm-Lu, Y) Eutectics", J. Crystal Growth, 218, 2000, pp. 67-73.
"Prices: Minerals", Asian Ceramics & Glass, Jan. 2001, 2 pages.
"Rare Earths: An Industry Review and Market Outlook—Part 1", Dow Jones Interactive Internet Printout on Jun. 20, 2001 for web address "http://ptg.djnr.com/ccroot/asp/publib/story.asp"; Chemical Business NewsBase, Dec. 8, 2000, 2 pages.
"Rare Earth—Market Confusion Inevitable Due to China's Unstable Supply", Japan Chemical Week, vol. 41, No. 2080, Jul. 6, 2000, pp. 6-7.
"Rare Earth Prices and Market Outlook", Dow Jones Interactive Internet Printout on Jun. 20, 2001 for web address "http://ptg.djnr.com/ccroot/asp/publib/story.asp"; Chemical Business NewsBase, May 27, 1999, 2 pages.
Rodriquez, Louise, "Rare Earths Prices Recover Despite China's Overcapacity", America Metal Market, vol. 109, No. 14, Jan. 22, 2001, p. 13.
Shishido et al., "$Gd_3Al_5O_{12}$ Phase Obtained by Crystallization of Amorphous $Gd_2O_3 \cdot {}^5/_3 Al_2O_3$," *Journal of the American Ceramic Society*, vol. 61, No. 7-8, Jul.-Aug. 1978, pp. 373-374.
Stankus, S. V. et al., "Crystallization and Thermal Properties of $Al_2O_3$-$Y_2O_3$ Melts," J. Crystal Growth, 167, 1996, pp. 165-170.
Stookey. S. D., Ceramics Made by Nucleation of Glass-Comparison of Microstructure and Properties with Sintered Ceramics, The American Ceramic Society, (1992), pp. 1-4.
Suzuki et al., "Rapid Quenching on the Binary Systems of High Temperature Oxides," *Mat. Res. Bull.*, vol. 9, 1974, pp. 745-754.
Toropov et al., "Phase Equilibira in the Yttrium Oxide-Alumina System", *Bulletin of the Academy of Sciences, USSR*, Division of Chemical Science, No. 7, Jul. 1964, pp. 1076-1081, A translation of Seriya Khimicheskaya.
"Traders' View on Chemical Business (Part 2): Rare Earth: Market Confusion Inevitable Due to China's Unstable Supply", Dow Jones Interactive Internet Printout on Jun. 20, 2001 for web address "http://ptg.djnr.com/ccroot/asp/publib/story.asp"; Chemical Business NewsBase, Aug. 10, 2000, 2 pages.
Varshneya, Arun K., "Fundamentsal of Inorganic Glasses", pp. 425-427 (1994).
van den Hoven et al., "Net Optical Gain at 1.53 μm in Er-Doped $Al_2O_3$ Waveguides Silicon," Appl. Phys. Lett. 68 (14), Apr. 1, 1966, pp. 1886-1888.
Volkova, I. Yu et al., Abstract for "Kinetics of Nonisothermal Sintering of Some Eutectic Oxide Compositions," 1986 (abstract from Database Chemabs 'Online! Chemical Abstracts Service, Columbus, Ohio, US).

Waku et al., "A ductile ceramic eutectic composite with high strength at 1,873 K", *Nature*, vol. 389, Sep. 1997, pp. 49-52.

Waku, Yoshiharu, "A New Ceramic Eutectic Composite with High Strength at 1873 K", *Advanced Materials*, vol. 10, No. 8, 1998, pp. 615-617.

Waku et al., "High-temperature strength and thermal stability of a unidirectionally solidified $Al_2O_3$/YAG eutectic composite", pp. 1217-1225.

Waku et al., "Sapphire matrix composites reinforced with single crystal VAG phases", *Journal of Materials Science*, vol. 31, 1996, pp. 4663-4670.

Waku, Yoshiharu, et al., "A jelly-like ceramic fiber at 1193 K", Mat Res Innovat, 2000, vol. 3, pp. 185-189.

Wang, S. et al., "Divorced Eutectic and Interface Characteristics in a Solidified YAG-Spinel Composite With Spinel-Rich Composition", J. Mat. Sci., 35, 2000, pp. 2757-2761.

Wang, Shuqiang et al., "Eutectic Precipitation of the Spinal Solid Solution-Yttrium Aluminum Garnet (YAG) System," *Journal of the American Ceramic Society*, 1998, vol. 81, No. 1, pp. 263-265.

Weber et al., Device Materials Based On Er-, Ho-, Tm-, and Yb-Doped Rare Earth Aluminum Oxide (REA1™) Glass, reference obtained in 2003, and believed to be based on a talk presented Jan. 28, 2003 (See website http://www.spie.org/Conference/Programs/03/pw/opto/index.cfm?fuseaction=4999, pp. 1 and 2 of 5).

Weber et al., "Rare Earth Oxide-Aluminum Oxide Glasses For Mid-Range IR Devices," reference obtained in 2003, and believed to be based on a talk presented Jan. 25, 2003 (See website http://www.spie.org/Conferences/Programs/03/pw/bios/index.cfm?fuseaction=4957, pp. 1 and 4 of 6).

Weber, J.K. Richard et al., "Glass fibres of pure and erbium- or neodymium-doped yttria-alumina compositions", Nature, Jun. 25, 1998, vol. 393, pp. 769-771.

Weber, J.K. Richard et al., "Glass Formation and Polyamorphism in Rare-Earth Oxide-Aluminum Oxide Compositions", J. American Ceramic Society, 83 [8], 2000, 1868-1872.

Yajima et al., Glass Formation in the Ln-Al-O System, (Ln: Lanthanoid and Yttrium Elements), Chemistry Letters, 1973, pp. 1327-1330.

Yajima et al., "Unusual Glass Formation in the Al-Nd-O System," Chemistry Letters (published by the Chemical Society of Japan), 1973, pp. 741-742.

Yan et al., "Erbium-Doped Phosphate Glass Waveguide on Silicon With 4.1 dB/cm Gain at 1.535 μm," Appl. Phys. Lett, 71 (20), Nov. 17, 1997.

Yang and Zhu, "Thermo-Mechanical Stability Of Directionally Solidified $Al_2O_3$-$ZrO_2(Y_2O_3)$ Eutectic Fibers", *Scripta Materialia*, vol. 36, No. 8, 1997, pp. 961-965.

Yau, W., "Increase in Value of Rare Earth Products Boosts Yixing Xinwei", South China Morning Post, Apr. 12, 2000, 2 pages.

U.S. Patent Application entitled "Fused $Al_2O_3$-$Y_2O_3$-$ZrO_2$ Eutectic Abrasive Particles, Abrasive Articles, And Methods Of Making And Using The Same", filed Jul. 19, 2000, Rosenflanz having U.S. Appl. No. 09/618,876.

U.S. Patent Application entitled, "Method of Making Ceramic Articles", filed Aug. 2, 2002, Rosenflanz having U.S. Appl. No. 10/211,491.

U.S. Patent Application entitled "Methods of Making Ceramic Particles", filed Feb. 5, 2003, Rosenflanz, having a U.S. Appl. No. 10/358,772.

U.S. Patent Application entitled "Methods of Making Ceramics", filed Feb. 5, 2003, Anderson et al., having a U.S. Appl. No. 10/358,765.

U.S. Patent Application entitled "Ceramics and Methods of Making the Same", filed Feb. 5, 2003, Celikkaya et al., having a U.S. Appl. No. 10/358,910.

U.S. Patent Application entitled "$Al_2O_3$-$La_2O_3$-$Y_2O_3$MgO Ceramics, and Methods of Making the Same", filed Feb. 5, 2003, Celikkaya et al., having a U.S. Appl. No. 10/358,855.

U.S. Application entitled "Use of Ceramics in Dental And Orthodontic Applications", filed Feb. 5, 2003, having a U.S. Appl. No. 10/358,856.

U.S. Patent Application entitled "Methods of Making $Al_2O_3$-$SiO_2$ Ceramics", filed Feb. 5, 2003, Celikkaya et al., having a U.S. Appl. No. 10/358,708.

U.S. Application entitled "Use of Glasses Containing Rare Earth Oxide, Alumina, and Zirconia And Dopant In Optical Waveguides", filed Apr. 28, 2003, having U.S. Appl. No. 10/425,039.

U.S. Application entitled "Methods of Making Ceramic Pictures", filed Sep. 5, 2003, having U.S. Appl. No. 10/655,729.

U.S. Application entitled "Methods of Making Ceramics Comprising $Al_2O_3$, REO, $ZrO_2$ and/or $HfO_2$ and $Nb_2O_5$ and/or $Ta_2O_5$", filed Sep. 18, 2003, having U.S. Appl. No. 10/666,615.

U.S. Application entitled "Ceramics Comprising $Al_2O_3$, REO, $ZrO_2$ and/or $HfO_2$, and $Nb_2O_5$ and/or $Ta_2O_5$, and Methods of Making The Same", filed Sep. 18, 2003, having U.S. Appl. 10/,666,212.

U.S. Application entitled "Agglomerate Abrasive Grain and a Method of Making the Same", filed Feb. 11, 2004, having U.S. Appl. No. 10/776,156.

Aasland and McMillan, Nature 369, 633 (1994).

Aguilar et al, "Melt Extraction Processing of Structural $Y_2O_3$-$Al_2O_3$ Fibers", J. Eur. Ceram. Soc. 20 1091-1098 (2000).

Gandhi, A.S. and Jarayam, V., "Pressure Consolidation of Amorphous $ZrO_2$-$Al_2O_3$ by Plastic Deformation of Powder Particles", Acta Materiala, 50 (2002), 2137-2149.

Gonzalez, Eduardo J., et al., "High Pressure Compaction and Sintering of Nano-Size $\gamma$-$Al_2O_3$ Powder", *Materials and Manufacturing Processes* vol. 11, No. 6, 951-967, 1996.

Jantzen, C.M., Krepski, R.P., & Herman, H., "Ultra-Rapid Quenching of Laser-Method Binary and Unary Oxides", *Mat. Res. Bull.* 15, 1313-1326 (1980).

Khor K.A., "Novel ZrO2-Mullite Composites Produced By Plasma Spraying", Proceedings of the 15th International Thermal Pray Conference, May 25-29, 1998, Nice, France.

Ray, C.S. and Day, D.E., "Determining the Nucleation Rate Curve for Lithium Disilicate Glass by Differential Thermal Analysis", J. Am. Ceram. Soc. 73(2) 439-442 (1990).

Schmucker, M, et al., "Constitution of Mullite Glasses Produced by Ultra-Rapid Quenching of Plasma-Sprayed Melts", Journal of the European Ceramic Society 15 (1995) 1201-1205.

Sarjeant, P.T. & Roy, R., in *Reactivity of Solids* (ed. J. W. Mitchell, R.C., DeVries, R.W., Roberts and P. Cannon) 725-33 (John Wiley & Sons, Inc., New York 1969).

Takamori, T., & Roy, R., "Rapid Crystallization of $SiO_2$-$Al_2O_3$ Glasses", Journal of American Society, vol. 56, No. 12, Dec. 1973.

Weber et al., "Synthesis and Optical Properties of Rare-Earth-Aluminum Oxide Glasses", J. Am. Ceram. Soc. 85(5) 1309-1311 (2002).

Wilding, M.C., McMillan, P.F., "Polymorphic Transitions in Yttria-Alumina Liquids", *J. Non-Cryst. Solids.* 293-295, 357-365 (2001).

U.S. Application entitled "Ceramics, and Methods of Making and Using the Same", filed Jul. 29, 2004.

U.S. Application entitled "Method of Making Ceramic Articles", filed Jul. 29, 2004.

U.S. Application entitled " Alumina-Yttria Particles and Methods of Making The Same", filed Dec. 18, 2003, having U.S. Appl. 10/740,262.

U.S. Application entitled "Method of Making Abrasive Particles", filed Dec. 18, 2003 having U.S. Appl. No. 10/739,420.

U.S. Application entitled "Method of Making Abrasive Particles", filed Dec. 18, 2003 having U.S. Appl. No. 10/739,624.

U.S. Application entitled "Transparent Fusad Crystalline Ceramics, And Method of Making The Same", filed Dec. 18, 2003 having U.S. Appl. No. 10/739,439.

U.S. Application entitled "Method of Making Abrasive Particles", filed Dec. 18, 2003 having U.S. Appl. No. 10/739,440.

U.S. Application entitled "Method of Making Abrasive Particles", filed Dec. 18, 2003 having U.S. Appl. No. 10/740,096.

U.S. Application entitled "Method of Making Abrasive Particles", filed Dec. 18, 2003 having U.S. Appl. No. 10/739,44.

U.S. Application entitled "Powder Feeding Method and Apparatus", filed Dec. 18, 2003 having U.S. Appl. No. 10/739,233.

* cited by examiner

CERAMICS COMPRISING $Al_2O_3$, $Y_2O_3$, $ZrO_2$ AND/OR $HfO_2$, AND $Nb_2O_5$ AND/OR $Ta_2O_5$ AND METHODS OF MAKING THE SAME

BACKGROUND

A number of amorphous (including glass) and glass-ceramic compositions are known. Many oxide glass systems utilize well-known glass-formers such as $SiO_2$, $B_2O_3$, $P_2O_5$, $GeO_2$, $TeO_2$, $As_2O_3$, and $V_2O_5$ to aid in the formation of the glass. Some of the glasses can be heat-treated to form glass ceramics.

SUMMARY

In one aspect, the present invention provides glasses and glass-ceramics comprising (i) at least one of $Nb_2O_5$ or $Ta_2O_5$ and (ii) at least two of (a) $Al_2O_3$, (b) $Y_2O_3$, or (c) at least one of $ZrO_2$ or $HfO_2$. In some embodiments, the glass is present in a ceramic (i.e., ceramic comprising the glass). Optionally, embodiments of glass according to the present invention can be heat-treated to convert at least a portion of the glass to crystalline ceramic to provide a glass-ceramic.

Embodiments of glasses according to the present invention may be useful, for example, for optical applications (e.g., lenses, optical coatings, retroreflective elements, windows (e.g., infrared (IR) windows), and optical waveguides). Some embodiments of glasses according to the present invention (e.g., those utilized in optical waveguides) may be used as a host material for the rare earth dopants, wherein if a "rare earth dopant" and an "REO" are both present in the glass, the rare earth dopant and REO are different.

In some embodiments, the present invention provides glass collectively comprising at least 70 (in some embodiments, at least 75, 80, 85, 90, 95, 97, 98, 99, or even 100) percent by weight of (i) at least one of $Nb_2O_5$ or $Ta_2O_5$ and (ii) at least two of (a) $Al_2O_3$, (b) $Y_2O_3$, or (c) at least one of $ZrO_2$ or $HfO_2$, and containing not more than 30 (in some embodiments, not more than 25, 20, 15, 10, 9, 8, 7, 6, 5, 4, 3, 2, 1, 0.5, 0.1, or even zero) percent by weight collectively $As_2O_3$, $B_2O_3$, $GeO_2$, $P_2O_5$, $SiO_2$, $TeO_2$, and $V_2O_5$, based on the total weight of the glass. In some embodiments, the glass comprises at least 1, 2, 3, 4, 5, 10, 15, 20, 25, 30, 35, 40, 45, 50, 55, 60, 65, or even at least 70 percent by weight $Al_2O_3$, at least 1, 2, 3, 4, 5, 10, 15, 20, 25, 30, 35, 40, 45, 50, 55, 60, 65, or even at least 70 percent by weight $Y_2O_3$; at least 1, 2, 3, 4, 5, 10, 15, 20, 25, 30, or even at least 35 percent by weight $ZrO_2$ (in some embodiments, $ZrO_2$ and/or (including collectively) $HfO_2$); and/or at least 1, 2, 3, 4, 5, 10, 15, 20, 25, 30, 35, 40, 45, 50, 55, 60, 65, or even at least 70 percent by weight of at least one of $Nb_2O_5$ or $Ta_2O_5$, based on the total weight of the glass. In some embodiments, the glass comprises at least 1 (in some embodiments, at least 2, 3, 4, 5, 6, 7, 8, 9, 10, 15, 20, 25, 30, 35, 40, 45, 50, 55, 60, 65, 70, 75, or even at least 80) percent by weight of the at least one of $Nb_2O_5$ or $Ta_2O_5$, based on the total weight of the glass. In some embodiments, the present invention provides a ceramic comprising the glass (in some embodiments, at least 1, 2, 3, 4, 5, 10, 15, 20, 25 30, 35, 40, 45, 50, 55, 60, 65, 70, 75, 80, 85, 90, 95, 96, 97, 98, 99, or even 100 percent by volume of the glass).

In some embodiments, the present invention provides a glass-ceramic collectively comprising at least 70 (in some embodiments, at least 75, 80, 85, 90, 95, 97, 98, 99, or even 100) percent by weight (i) at least one of $Nb_2O_5$ or $Ta_2O_5$ and (ii) at least two of (a) $Al_2O_3$, (b) $Y_2O_3$, or (c) at least one of $ZrO_2$ or $HfO_2$, and containing not more than 30 (in some embodiments, not more than 25, 20, 15, 10, 9, 8, 7, 6, 5, 4, 3, 2, 1, 0.5, 0.1, or even zero) percent by weight collectively $As_2O_3$, $B_2O_3$, $GeO_2$, $P_2O_5$, $SiO_2$, $TeO_2$, and $V_2O_5$, based on the total weight of the glass-ceramic. In some embodiments, the glass-ceramic comprises at least 1, 2, 3, 4, 5, 10, 15, 20, 25, 30, 35, 40, 45, 50, 55, 60, 65, or even at least 70 percent by weight $Al_2O_3$, at least 1, 2, 3, 4, 5, 10, 15, 20, 25, 30, 35, 40, 45, 50, 55, 60, 65, or even at least 70 percent by weight $Y_2O_3$; at least 1, 2, 3, 4, 5, 10, 15, 20, 25, 30, or even at least 35 percent by weight at least one of $ZrO_2$ or $HfO_2$; and/or at least 1, 2, 3, 4, 5, 10, 15, 20, 25, 30, 35, 40, 45, 50, 55, 60, 65, or even at least 70 percent by weight of at least one of $Nb_2O_5$ or $Ta_2O_5$, based on the total weight of the glass-ceramic. In some embodiments, the glass-ceramic comprises at least 1 (in some embodiments, at least 2, 3, 4, 5, 6, 7, 8, 9, 10, 15, 20, 25, 30, 35, 40, 45, 50, 55, 60, 65, 70, 75, or even at least 80) percent by weight of the at least one of $Nb_2O_5$ or $Ta_2O_5$, based on the total weight of the glass-ceramic.

For some embodiments, glasses, glass-ceramics, and crystalline ceramics according to the present invention further comprise at least one additional metal oxide (e.g., $Y_2O_3$, MgO, $TiO_2$, $Cr_2O_3$, CuO, SrO, $Li_2O$, NiO, and/or $Fe_2O_3$). For some embodiments, glasses, glass-ceramics, and crystalline ceramics according to the present invention, contain not more than 20 (in some embodiments, less than 15, 10, 5, 4, 3, 2, 1, 0.5, 0.1, or even zero) percent by weight $SiO_2$ and not more than 20 (in some embodiments, not more than 15, 10, 5, 4, 3, 2, 1, 0.5, 0.1, or even zero) percent by weight $B_2O_3$, based on the total weight of the glass, glass-ceramic, and crystalline ceramic, respectively.

Some embodiments of glass-ceramics according to the present invention may comprise the glass of the glass-ceramic in an amount, for example, of at least 1, 2, 3, 5, 10, 15, 20, 25, 30, 35, 40, 45, 50, 55, 60, 65, 70, 75, 80, 85, 90, or even 95 percent by volume, based on the total volume of the glass-ceramic. Some embodiments of glass-ceramics according to the present invention may comprise the crystalline ceramic of the glass-ceramic in an amount, for example, of at least 5, 10, 15, 20, 25, 30, 35, 40, 45, 50, 55, 60, 65, 70, 75, 80, 85, 90, 95, 97, 98, 99, or even 100 percent by volume, based on the total volume of the glass-ceramic.

In some embodiments, the present invention provides a method for making glass according to the present invention, the method comprising:

melting sources of (i) at least one of $Nb_2O_5$ or $Ta_2O_5$ and (ii) at least two of (a) $Al_2O_3$, (b) $Y_2O_3$, or (c) at least one of $ZrO_2$ or $HfO_2$ to provide a melt; and cooling the melt to provide the glass. In some embodiments, the glass is present in a ceramic (i.e., ceramic comprising the glass). In some embodiments, the glass can be heat-treated to convert at least a portion of the glass to crystalline ceramic to provide a glass-ceramic.

In some embodiments, the present invention provides a method for making an article comprising glass according to the present invention, the method comprising:

providing glass beads comprising glass according to the present invention (e.g., melting at least sources of (i) at least one of $Nb_2O_5$ or $Ta_2O_5$ and (ii) at least two of (a) $Al_2O_3$, (b) $Y_2O_3$, or (c) at least one of $ZrO_2$ or $HfO_2$, as applicable, to provide a melt; cooling the melt to provide the glass beads), wherein the glass has a $T_g$; and heating the glass beads above the $T_g$ such that the glass beads coalesce to form a shape and provide the article.

In some embodiments, the glass present in the article can be heat-treated to convert at least a portion of the glass to crystalline ceramic to provide a glass-ceramic.

In some embodiments, the present invention provides a method for making an article comprising glass according to the present invention, the method comprising:

providing glass beads comprising glass according to the present invention (e.g., melting at least sources of (i) at least one of $Nb_2O_5$ or $Ta_2O_5$ and (ii) at least two of (a) $Al_2O_3$, (b) $Y_2O_3$, or (c) at least one of $ZrO_2$ or $HfO_2$, as applicable, to provide a melt; cooling the melt to provide the glass beads), wherein the glass has a $T_g$; and heating the glass beads above the $T_g$ such that the glass beads coalesce to form a shape and provide the article. In some embodiments, the glass present in the article can be heat-treated to convert at least a portion of the glass to crystalline ceramic to provide a glass-ceramic.

In some embodiments, the present invention provides a method for making an article comprising glass according to the present invention, the method comprising:

providing glass powder comprising glass according to the present invention (e.g., converting glass beads according to the present invention to provide the glass powder), wherein the glass has a $T_g$; and heating the glass powder above the $T_g$ such that the glass powder coalesces to form a shape and provide the article. In some embodiments, the glass present in the article can be heat-treated to convert at least a portion of the glass to crystalline ceramic to provide a glass-ceramic. Optionally, the glass powder is provided by converting (e.g., crushing) glass (e.g., glass beads and/or bulk glass) according to the present invention to glass powder.

In some embodiments, glass-ceramic according to the present invention is converted (e.g., crushed) to provide particles (e.g., abrasive particles).

In this application:

"amorphous material" refers to material derived from a melt and/or a vapor phase that lacks any long range crystal structure as determined by X-ray diffraction and/or has an exothermic peak corresponding to the crystallization of the amorphous material as determined by a DTA (differential thermal analysis) as determined by the test described herein entitled "Differential Thermal Analysis";

"ceramic" includes glass, crystalline ceramic, glass-ceramic, and combinations thereof;

"complex metal oxide" refers to a metal oxide comprising two or more different metal elements and oxygen (e.g., $CeAl_{11}O_{18}$, $Dy_3Al_5O_{12}$, $MgAl_2O_4$, and $Y_3Al_5O_{12}$);

"complex $Al_2O_3$.metal oxide" refers to a complex metal oxide comprising, on a theoretical oxide basis, $Al_2O_3$ and one or more metal elements other than Al (e.g., $CeAl_{11}O_{18}$, $Dy_3Al_5O_{12}$, $MgAl_2O_4$, and $Y_3Al_5O_{12}$);

"complex $Al_2O_3.Y_2O_3$" refers to a complex metal oxide comprising, on a theoretical oxide basis, $Al_2O_3$ and $Y_2O_3$ (e.g., $Y_3Al_5O_{12}$);

"complex $Al_2O_3$.REO" refers to a complex metal oxide comprising, on a theoretical oxide basis, $Al_2O_3$ and rare earth oxide (e.g., $CeAl_{11}O_{18}$ and $Dy_3Al_5O_{12}$);

"glass" refers to amorphous material exhibiting a glass transition temperature;

"glass-ceramic" refers to ceramic comprising crystals formed by heat-treating glass;

"$T_g$" refers to the glass transition temperature as determined by the test described herein entitled "Differential Thermal Analysis";

"$T_x$" refers to the crystallization temperature as determined by the test described herein entitled "Differential Thermal Analysis";

"rare earth oxides" refers to cerium oxide (e.g., $CeO_2$), dysprosium oxide (e.g., $Dy_2O_3$), erbium oxide (e.g., $Er_2O_3$), europium oxide (e.g., $Eu_2O_3$), gadolinium oxide (e.g., $Gd_2O_3$), holmium oxide (e.g., $Ho_2O_3$), lanthanum oxide (e.g., $La_2O_3$), lutetium oxide (e.g., $Lu_2O_3$), neodymium oxide (e.g., $Nd_2O_3$), praseodymium oxide (e.g., $Pr_6O_{11}$), samarium oxide (e.g., $Sm_2O_3$), terbium oxide (e.g., $Tb_2O_3$), thorium oxide (e.g., $Th_4O_7$), thulium oxide (e.g., $Tm_2O_3$), and ytterbium oxide (e.g., $Yb_2O_3$), and combinations thereof;

"REO" refers to rare earth oxide(s); and

"rare earth dopant" refers to a dopant (i.e., cerium, praseodymium, neodymium, promethium, samarium, europium, gadolinium, terbium, dysprosium, holmium, erbium, thulium, ytterbium, or their other compounds, and mixtures thereof) that provides light emission in response to excitation of its electrons and is a different material than REO.

Further, it is understood herein that unless it is stated that a metal oxide (e.g., $Al_2O_3$, complex $Al_2O_3$.metal oxide, etc.) is crystalline, for example, in a glass-ceramic, it may be crystalline, or portions glass and portions crystalline. For example, if a glass-ceramic comprises $Al_2O_3$ and $ZrO_2$, the $Al_2O_3$ and $ZrO_2$ may each be in a glass state, crystalline state, or portions in a glass state and portions in a crystalline state, or even as a reaction product with another metal oxide(s) (e.g., unless it is stated that, for example, $Al_2O_3$ is present as crystalline $Al_2O_3$ or a specific crystalline phase of $Al_2O_3$ (e.g., alpha $Al_2O_3$), it may be present as crystalline $Al_2O_3$ and/or as part of one or more crystalline complex $Al_2O_3$.metal oxides).

Some embodiments of ceramics (e.g., glasses and glass-ceramics) according to the present invention can be made, formed as, or converted into beads (e.g., beads having diameters of at least 1 micrometers, 5 micrometers, 10 micrometers, 25 micrometers, 50 micrometers, 100 micrometers, 150 micrometers, 250 micrometers, 500 micrometers, 750 micrometers, 1 mm, 5 mm, or even at least 10 mm), articles (e.g., plates), fibers, particles, and coatings (e.g., thin coatings). Embodiments of the beads can be useful, for example, in reflective devices such as retro-reflective sheeting, alphanumeric plates, and pavement markings. Embodiments of the particles and fibers are useful, for example, as thermal insulation, filler, or reinforcing material in composites (e.g., ceramic, metal, or polymeric matrix composites). Embodiments of the thin coatings can be useful, for example, as protective coatings in applications involving wear, as well as for thermal management. Examples of articles according of the present invention include kitchenware (e.g., plates), dental brackets, and reinforcing fibers, cutting tool inserts, abrasive materials, and structural components of gas engines, (e.g., valves and bearings). Exemplary embodiments of other articles include those having a protective coating of glass-ceramic on the outer surface of a body or other substrate. Certain glass-ceramic particles made according to the present invention can be particularly useful as abrasive particles. The abrasive particles can be incorporated into an abrasive article, or used in loose form.

In one aspect, the present invention provides an optical waveguide comprising a substrate (e.g., at least one of silicon or $SiO_2$); and a glass according to the present invention doped with a rare earth dopant on a surface of the substrate. In some embodiments, the substrate is a lower low refractive index layer and further comprises an upper low refractive index layer.

In one aspect, the present invention provides an optical waveguide comprising a glass fiber having a core material and a cladding surrounding the core material, wherein the core material comprises a glass according to the present invention doped with a rare earth dopant.

In one aspect, the present invention provides an optical amplifier comprising an optical pump source which provides optical pump light; and an optical waveguide coupled to receive the optical pump light from the optical pump source, wherein the optical waveguide comprises a glass according to the present invention doped with a rare earth dopant.

In one aspect, the present invention provides a method for amplifying optical signals, the method comprising:

inputting the optical signals to an optical waveguide comprising a glass according to the present invention doped with a rare earth dopant; and applying pump light to the optical waveguide to cause the waveguide to provide optical gain to the optical input signals.

DETAILED DESCRIPTION

Figure 1:
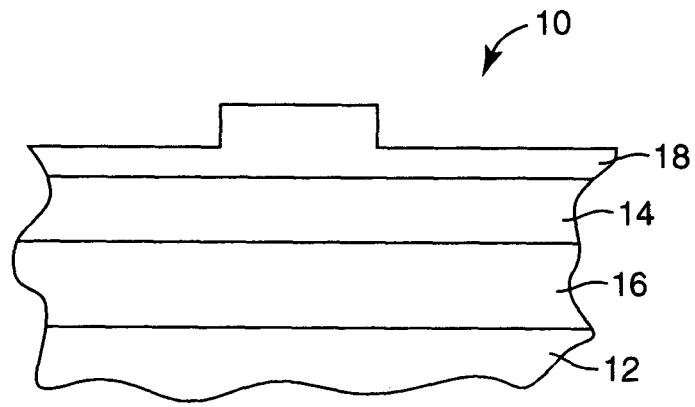
FIG. 1 is a cross-sectional illustration of an exemplary embodiment of an optical waveguide described herein.

Embodiments of glasses according to the present invention are useful for optical waveguide applications. Referring to FIG. 1, a cross-sectional view of an exemplary optical waveguide 10 in accordance with one exemplary embodiment of the invention is shown. Optical waveguide 10 is shown deposited on a silicon substrate 12 and includes rare earth doped layer 14. Rare earth doped layer 14 is sandwiched between two cladding layers, a lower low refraction index layer 16 and an upper low refraction index layer 18. The optical waveguide in FIG. 1 is meant to be for illustrative purposes only. The glasses described herein may be used in any waveguide configuration that utilizes doped-materials.

Figure 2:
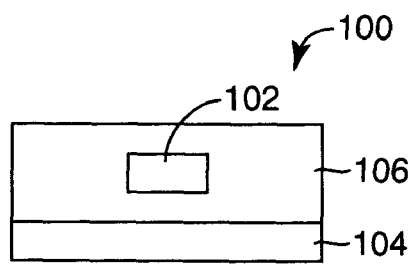
FIG. 2 is a cross-sectional illustration of another exemplary embodiment of an optical waveguide described herein.
Figure 3:
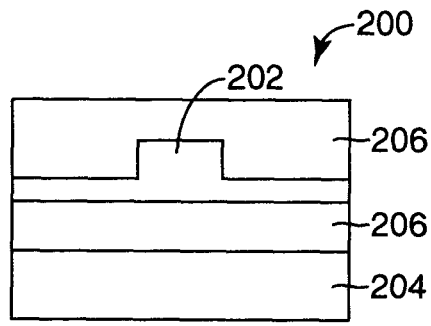
FIG. 3 is a cross-sectional illustration of another exemplary embodiment of an optical waveguide described herein.
Figure 4:
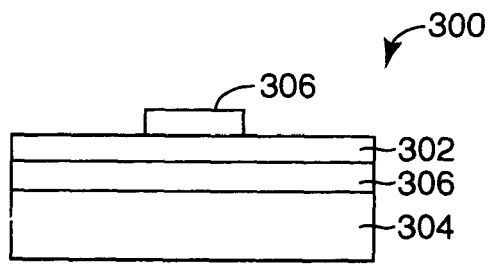
FIG. 4 is a cross-sectional illustration of another exemplary embodiment of an optical waveguide described herein.
Figure 5:
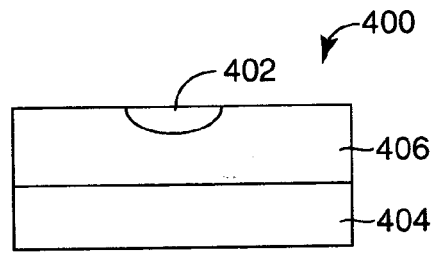
FIG. 5 is a cross-sectional illustration of another exemplary embodiment of an optical waveguide described herein.
Figure 6:
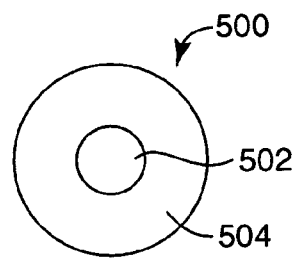
FIG. 6 is a cross-sectional illustration of another exemplary embodiment of an optical waveguide described herein.

Optical waveguides of the invention may also include configurations known as "channel" waveguides, "ridge" waveguides, "strip-loaded" waveguides, and "diffused" or "ion exchanged" waveguides and waveguides in the form of a fiber. FIGS. 2–6 show illustrations of cross-sections of such embodiments depicted as waveguides 100, 200, 300, 400, and 500. Referring to FIGS. 2–4, rare earth doped glass 102, 202, 302, 402 is adjacent to a lower low refractive index layer deposited on a silicon substrate 104, 204, 304, 404. Upper low refractive index layer 206, 306 is in contact with rare earth doped glass 202, 302 in some embodiments. Referring to FIG. 6, rare earth doped glass core 502 is surrounded by low refractive index cladding 504. Examples of useful low refractive index materials for use in the optical waveguides of the invention include $SiO_2$, SiON, and glasses (un-doped) comprising for example, lanthanum, aluminum, and/or zirconium oxide. In some instances, it may be desirable to use an un-doped glass as described below, as the glass of an optical waveguide.

Figure 7:
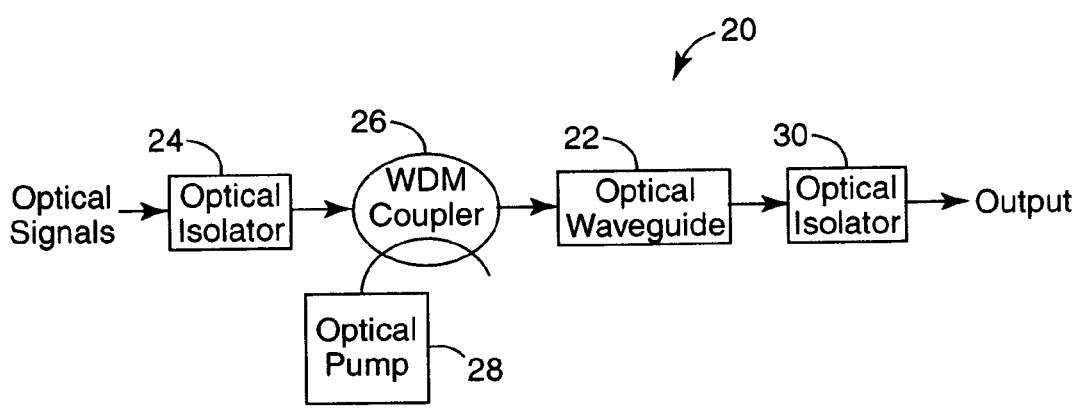
FIG. 7 is an illustration of an exemplary embodiment of an optical waveguide amplifier configuration of the invention.

FIG. 7 illustrates an exemplary standard waveguide amplifier configuration 20 containing an optical waveguide 22. Optical signals are input into the optical waveguide 22 via an optical isolator 24 and a waveguide division multiplexing (WDM) coupler 26. An optical pump signal from an optical pump source 28 is also input into the optical waveguide 22 via the WDM coupler 26. The amplified output signals from the optical waveguide 22 are output through a second optical isolator 30. The optical isolators 22, 30 are included to eliminate backward reflections from the optical waveguide 22 to the input port and from the output port, respectively. The above waveguide amplifier configuration is for illustrative purposes only. More detailed information regarding waveguide amplifiers may be found in U.S. Pat. No. 6,490,081 B1 (Feillens et al). The optical waveguides of the invention may be useful in any configuration used to amplify optical signals.

Ceramics (including glasses and glass-ceramics) according to the present invention can be prepared by selecting the raw materials, the desired composition, and the processing technique(s).

Sources, including commercial sources, of (on a theoretical oxide basis) $Al_2O_3$ include bauxite (including both natural occurring bauxite and synthetically produced bauxite), calcined bauxite, hydrated aluminas (e.g., boehmite, and gibbsite), aluminum, Bayer process alumina, aluminum ore, gamma alumina, alpha alumina, aluminum salts, aluminum nitrates, and combinations thereof. The $Al_2O_3$ source may contain, or only provide, $Al_2O_3$. Alternatively, the $Al_2O_3$ source may contain, or provide $Al_2O_3$, as well as one or more metal oxides other than $Al_2O_3$ (including materials of or containing complex $Al_2O_3$.metal oxides (e.g., $Dy_3Al_5O_{12}$, $Y_3Al_5O_{12}$, $CeAl_{11}O_{18}$, etc.)).

Sources, including commercial sources, of $Nb_2O_5$ include niobium oxide powders, niobium containing ores (e.g., columbite, tantalite, and euxelite), niobium salts, niobium metals, and combinations thereof.

Sources, including commercial sources, of $Ta_2O_5$ include tantalum oxide powders, tantalum containing ores (e.g., columbite, tantalite, and euxelite), tantalum salts, tantalum metals, and combinations thereof.

Sources, including commercial sources, of (on a theoretical oxide basis) $Y_2O_3$ include yttrium oxide powders, yttrium, yttrium-containing ores, and yttrium salts (e.g., yttrium carbonates, nitrates, chlorides, hydroxides, and combinations thereof). The $Y_2O_3$ source may contain, or only provide, $Y_2O_3$. Alternatively, the $Y_2O_3$ source may contain, or provide $Y_2O_3$, as well as one or more metal oxides other than $Y_2O_3$ (including materials of or containing complex $Y_2O_3$.metal oxides (e.g., $Y_3Al_5O_{12}$))

Sources, including commercial sources, of (on a theoretical oxide basis) $ZrO_2$ include zirconium oxide powders, zircon sand, zirconium, zirconium-containing ores, and zirconium salts (e.g., zirconium carbonates, acetates, nitrates, chlorides, hydroxides, and combinations thereof). In addition, or alternatively, the $ZrO_2$ source may contain, or provide $ZrO_2$, as well as other metal oxides such as hafnia. Sources, including commercial sources, of (on a theoretical oxide basis) $HfO_2$ include hafnium oxide powders, hafnium, hafnium-containing ores, and hafnium salts. In addition, or alternatively, the $HfO_2$ source may contain, or provide $HfO_2$, as well as other metal oxides such as $ZrO_2$.

For embodiments comprising $ZrO_2$ and $HfO_2$, the weight ratio of $ZrO_2$:$HfO_2$ may be in a range of 1: zero (i.e., all $ZrO_2$; no $HfO_2$) to zero: 1, as well as, for example, at least about 99, 98, 97, 96, 95, 90, 85, 80, 75, 70, 65, 60, 55, 50, 45, 40, 35, 30, 25, 20, 15, 10, and 5 parts (by weight) $ZrO_2$ and a corresponding amount of $HfO_2$ (e.g., at least about 99 parts (by weight) $ZrO_2$ and not greater than about 1 part $HfO_2$) and at least about 99, 98, 97, 96, 95, 90, 85, 80, 75, 70, 65, 60, 55, 50, 45, 40, 35, 30, 25, 20, 15, 10, and 5 parts $HfO_2$ and a corresponding amount of $ZrO_2$.

Other useful metal oxides may also include, on a theoretical oxide basis, BaO, CaO, $Cr_2O_3$, CoO, $Fe_2O_3$, $GeO_2$, $Li_2O$, MgO, MnO, NiO, $Na_2O$, REO, $Sc_2O_3$, SrO, $TiO_2$, ZnO, and combinations thereof. Sources, including commercial sources, include the oxides themselves, metal powders, complex oxides, ores, carbonates, acetates, nitrates, chlorides, hydroxides, etc. For example, sources, including commercial sources, of rare earth oxides include rare earth oxide powders, rare earth metals, rare earth-containing ores (e.g., bastnasite and monazite), rare earth salts, rare earth nitrates, and rare earth carbonates. The rare earth oxide(s) source may contain, or only provide, rare earth oxide(s). Alternatively, the rare earth oxide(s) source may contain, or provide rare earth oxide(s), as well as one or more metal oxides other than rare earth oxide(s) (including materials of or containing complex rare earth oxide-other metal oxides (e.g., $Dy_3Al_5O_{12}$, $CeAl_{11}O_{18}$, etc.)).

In some embodiments, it may be advantageous for at least a portion of a metal oxide source (in some embodiments, 10, 15, 20, 25, 30, 35, 40, 45, 50, 55, 60, 65, 70, 75, 80, 85, 90, 95, or even 100 percent by weight) to be obtained by adding particulate, metallic material comprising at least one of a metal (e.g., Al, Ca, Cu, Cr, Fe, Li, Mg, Ni, Ag, Ti, Zr, and combinations thereof), M, that has a negative enthalpy of oxide formation or an alloy thereof to the melt, or otherwise combining them with the other raw materials. Although not wanting to be bound by theory, it is believed that the heat resulting from the exothermic reaction associated with the oxidation of the metal is beneficial in the formation of a homogeneous melt and resulting glass. For example, it is believed that the additional heat generated by the oxidation reaction within the raw material eliminates, minimizes, or at least reduces insufficient heat transfer, and hence facilitates formation and homogeneity of the melt, particularly when forming glass particles with x, y, and z dimensions over 50 (over 100, or even over 150) micrometers. It is also believed that the availability of the additional heat aids in driving various chemical reactions and physical processes (e.g., densification, and spherodization) to completion. Further, it is believed for some embodiments, the presence of the additional heat generated by the oxidation reaction actually enables the formation of a melt, which otherwise is difficult or not practical due to high melting point of the materials. Further, the presence of the additional heat generated by the oxidation reaction actually enables the formation of glass that otherwise could not be made, or could not be made in the desired size range. Another advantage of the invention includes, in forming the glasses, that many of the chemical and physical processes such as melting, densification and spherodizing can be achieved in a short time, so that very high quench rates may be achieved. For additional details, see co-pending application having U.S. Ser. No. 10/211,639, filed the Aug. 2, 2002, the disclosure of which is incorporated herein by reference.

In one aspect of the invention, the raw materials are fed independently to form the molten mixture. In another aspect of the invention, certain raw materials are mixed together, while other raw materials are added independently into the molten mixture. In some embodiments, for example, the raw materials are combined or mixed together prior to melting. The raw materials may be combined in any suitable and known manner to form a substantially homogeneous mixture. These combining techniques include ball milling, mixing, tumbling and the like. The milling media in the ball mill may be metal balls, ceramic balls and the like. The ceramic milling media may be, for example, alumina, zirconia, silica, magnesia and the like. The ball milling may occur dry, in an aqueous environment, or in a solvent-based (e.g., isopropyl alcohol) environment. If the raw material batch contains metal powders, then it is generally desired to use a solvent during milling. This solvent may be any suitable material with the appropriate flash point and ability to disperse the raw materials. The milling time may be from a few minutes to a few days, generally between a few hours to 24 hours. In a wet or solvent based milling system, the liquid medium is removed, typically by drying, so that the resulting mixture is typically homogeneous and substantially devoid of the water and/or solvent. If a solvent based milling system is used, during drying, a solvent recovery system may be employed to recycle the solvent. After drying, the resulting mixture may be in the form of a "dried cake". This cake-like mixture may then be broken up or crushed into the desired particle size prior to melting. Alternatively, for example, spray-drying techniques may be used. The latter typically provides spherical particulates of a desired oxide mixture. The precursor material may also be prepared by wet chemical methods including precipitation and sol-gel. Such methods will be beneficial if extremely high levels of homogeneity are desired.

Particulate raw materials are typically selected to have particle sizes such that the formation of a homogeneous melt can be achieved rapidly. Typically, raw materials with relatively small average particle sizes and narrow distributions are used for this purpose. In some methods (e.g., flame forming and plasma spraying), particularly desirable particulate raw materials are those having an average particle size in a range from about 5 nm to about 50 micrometers (in some embodiments, in a range from about 10 nm to about 20 micrometers, or even about 15 nm to about 1 micrometer), wherein at least 90 (in some embodiments, 95, or even 100) percent by weight of the particulate is the raw material, although sizes outside of the sizes and ranges may also be useful. Particulate less than about 5 nm in size tends to be difficult to handle (e.g., the flow properties of the feed particles tended to be undesirable as they tend to have poor flow properties). Use of particulate larger than about 50 micrometers in typical flame forming or plasma spraying processes tend to make it more difficult to obtain homogenous melts and glasses and/or the desired composition.

Furthermore, in some cases, for example, when particulate material is fed in to a flame or thermal or plasma spray apparatus to form the melt, it may be desirable for the particulate raw materials to be provided in a range of particle sizes. Although not wanting to be bound by theory, it is believed that this maximizes the packing density and strength of the feed particles. If the raw material powders are too coarse, the feed and resulting melt particles may not have the desired composition or uniformity. In general, the coarsest raw material particles should be smaller than the desired melt or glass particle sizes. Further, raw material particles that are too coarse, tend to have insufficient thermal and mechanical stresses in the feed particles, for example, during a flame forming or plasma spraying step. The end result in such cases is generally fracturing of the feed particles in to smaller fragments, loss of compositional uniformity, loss of yield in desired glass particle sizes, or even incomplete melting as the fragments generally change their trajectories in a multitude of directions out of the heat source.

The glasses and ceramics comprising glass can be made, for example, by heating (including in a flame or plasma) the appropriate metal oxide sources to form a melt, (desirably a homogenous melt) and then cooling the melt to provide glass. Some embodiments of glasses can be made, for example, by melting the metal oxide sources in any suitable furnace (e.g., an inductively or resistively heated furnace, a gas-fired furnace, or an electric arc furnace).

The glass is typically obtained by relatively rapidly cooling the molten material (i.e., the melt). The quench rate (i.e., the cooling time) to obtain the glass depends upon many factors, including the chemical composition of the melt, the glass-forming ability of the components, the thermal properties of the melt and the resulting glass, the processing technique(s), the dimensions and mass of the resulting glass, and the cooling technique. In general, relatively higher quench rates are required to form glasses comprising higher amounts of $Al_2O_3$ (i.e., greater than 75 percent by weight $Al_2O_3$), especially in the absence of known glass formers such as $SiO_2$, $B_2O_3$, $P_2O_5$, $GeO_2$, $TeO_2$, $As_2O_3$, and $V_2O_5$. Similarly, it is more difficult to cool melts into glasses in larger dimensions, as it is more difficult to remove heat fast enough.

In some embodiments of the invention, the raw materials are heated into a molten state in a particulate form and subsequently cooled into glass particles. Typically, the particles have a particle size greater than 25 micrometers (in some embodiments, greater than 50, 100, 150, or even 200 micrometers).

The quench rates achieved in making glasses according to the methods of the present invention are believed to be higher than $10^2$, $10^3$, $10^4$, $10^5$ or even $10^{6\circ}$ C./sec (i.e., a temperature drop of 1000° C. from a molten state in less than 10 seconds, less than a second, less than a tenth of a second, less than a hundredth of a second or even less than a thousandth of a second, respectively). Techniques for cooling the melt include discharging the melt into a cooling media (e.g., high velocity air jets, liquids (e.g., cold water), metal plates (including chilled metal plates), metal rolls (including chilled metal rolls), metal balls (including chilled metal balls), and the like). Other cooling techniques known in the art include roll-chilling. Roll-chilling can be carried out, for example, by melting the metal oxide sources at a temperature typically 20–200° C. higher than the melting point, and cooling/quenching the melt by spraying it under high pressure (e.g., using a gas such as air, argon, nitrogen or the like) onto a high-speed rotary roll(s). Typically, the rolls are made of metal and are water-cooled. Metal book molds may also be useful for cooling/quenching the melt.

The cooling rate is believed to affect the properties of the quenched glass. For instance, glass transition temperature, density and other properties of glass typically change with cooling rates.

Rapid cooling may also be conducted under controlled atmospheres, such as a reducing, neutral, or oxidizing environment to maintain and/or influence the desired oxidation states, etc. during cooling. The atmosphere can also influence glass formation by influencing crystallization kinetics from undercooled liquid. For example, larger undercooling of $Al_2O_3$ melts without crystallization has been reported in argon atmosphere as compared to that in air.

In one method, glasses and ceramics comprising glass can be made utilizing flame fusion as reported, for example, in U.S. Pat. No. 6,254,981 (Castle). In this method, the metal oxide sources are fed (e.g., in the form of particles, sometimes referred to as "feed particles") directly into a burner (e.g., a methane-air burner, an acetylene-oxygen burner, a hydrogen-oxygen burner, and the like), and then quenched, for example, in water, cooling oil, air, or the like. The size of feed particles fed into the flame generally determines the size of the resulting particles comprising glass.

Some embodiments of glasses can also be obtained by other techniques, such as: laser spin melting with free fall cooling, Taylor wire technique, plasmatron technique, hammer and anvil technique, centrifugal quenching, air gun splat cooling, single roller and twin roller quenching, roller-plate quenching, and pendant drop melt extraction (see, e.g., *Rapid Solidification of Ceramics*, Brockway et al. Metals And Ceramics Information Center, A Department of Defense Information Analysis Center, Columbus, Ohio, January, 1984). Some embodiments of glasses may also be obtained by other techniques, such as: thermal (including flame or laser or plasma-assisted) pyrolysis of suitable precursors, physical vapor synthesis (PVS) of metal precursors and mechanochemical processing.

Other techniques for forming melts, cooling/quenching melts, and/or otherwise forming glass include vapor phase quenching, plasma spraying, melt-extraction, and gas or centrifugal atomization. Vapor phase quenching can be carried out, for example, by sputtering, wherein the metal alloys or metal oxide sources are formed into a sputtering target(s). The target is fixed at a predetermined position in a sputtering apparatus, and a substrate(s) to be coated is placed at a position opposing the target(s). At typical pressures of $10^{-3}$ torr of oxygen gas and Ar gas, a discharge is generated between the target(s) and substrate(s), and Ar or oxygen ions collide against the target to cause reaction sputtering, thereby depositing a film of composition on the substrate. For additional details regarding plasma spraying, see, for example, co-pending application having U.S. Ser. No. 10/211,640, filed Aug. 2, 2002, the disclosure of which is incorporated herein by reference.

Gas atomization involves heating feed particles to convert them to a melt. A thin stream of such melt is atomized through contact with a disruptive air jet (i.e., the stream is divided into fine droplets). The resulting substantially discrete, generally ellipsoidal glass particles (e.g., beads) are then recovered. Examples of bead sizes include those having a diameter in a range of about 5 micrometers to about 3 mm. Melt-extraction can be carried out, for example, as reported in U.S. Pat. 5,605,870 (Strom-Olsen et al.). Container-less glass forming techniques utilizing laser beam heating as reported, for example, in U.S. Pat. No. 6,482,758 (Weber), may also be useful in making the glass.

Typically, glass-ceramics made according to the present invention, and some glasses and ceramics comprising glasses used to make such glass-ceramics, have x, y, and z dimensions each perpendicular to each other, and wherein each of the x, y, and z dimensions are at least 10 micrometers. In some embodiments, the x, y, and z dimensions are at least 30 micrometers, 35 micrometers, 40 micrometers, 45 micrometers, 50 micrometers, 75 micrometers, 100 micrometers, 150 micrometers, 200 micrometers, 250 micrometers, 500 micrometers, 1000 micrometers, 2000 micrometers, 2500 micrometers, 5 mm, or even at least 10 mm, if coalesced. The x, y, and z dimensions of a material are determined either visually or using microscopy, depending on the magnitude of the dimensions. The reported z dimension is, for example, the diameter of a sphere, the thickness of a coating, or the shortest dimension of a prismatic shape.

The addition of certain other metal oxides may alter the properties and/or crystalline structure or microstructure of glass-ceramics made according to the present invention, as well as the processing of the raw materials and intermediates in making the ceramic. For example, oxide additions such as CaO, $Li_2O$, MgO, and $Na_2O$ have been observed to alter both the $T_g$ and $T_x$ (wherein $T_x$ is the crystallization temperature) of glass. Although not wishing to be bound by theory, it is believed that such additions influence glass formation. Further, for example, such oxide additions may decrease the melting temperature of the overall system (i.e., drive the system toward lower melting eutectic), and ease glass formation. Compositions based upon complex eutectics in multi-component systems (quaternary, etc.) may have better glass-forming ability. The viscosity of the liquid melt and viscosity of the glass in its' working range may also be affected by the addition of metal oxides other than the particular required oxide(s).

Crystallization of glasses and ceramics comprising the glass to form glass-ceramics may also be affected by the additions of materials. For example, certain metals, metal oxides (e.g., titanates and zirconates), and fluorides may act as nucleation agents resulting in beneficial heterogeneous nucleation of crystals. Also, addition of some oxides may change the nature of metastable phases devitrifying from the glass upon reheating. In another aspect, for glass-ceramics made according to the present invention comprising crystalline $ZrO_2$, it may be desirable to add metal oxides (e.g., $Y_2O_3$, $TiO_2$, $CeO_2$, CaO, and MgO) that are known to stabilize the tetragonal/cubic form of $ZrO_2$.

The particular selection of metal oxide sources and other additives for making glass-ceramics made according to the present invention typically takes into account, for example, the desired composition, the microstructure, the degree of crystallinity, the physical properties (e.g., hardness or toughness), the presence of undesirable impurities, and the desired or required characteristics of the particular process (including equipment and any purification of the raw materials before and/or during fusion and/or solidification) being used to prepare the ceramics.

In some instances, it may be preferred to incorporate limited amounts of metal oxides selected from the group consisting of: $B_2O_3$, $Na_2O$, $P_2O_5$, $SiO_2$, $TeO_2$, $V_2O_5$, and combinations thereof. Sources, including commercial sources, include the oxides themselves, complex oxides, elemental (e.g., Si) powders, ores, carbonates, acetates, nitrates, chlorides, hydroxides, etc. These metal oxides may be added, for example, to modify a physical property of the resulting glass-ceramic and/or improve processing. These metal oxides, when used, are typically added from greater than 0 to 20% by weight collectively (in some embodiments, greater than 0 to 5% by weight collectively, or even greater than 0 to 2% by weight collectively) of the glass-ceramic depending, for example, upon the desired property.

The microstructure or phase composition (glassy/crystalline) of a material can be determined in a number of ways. Various information can be obtained using optical microscopy, electron microscopy, differential thermal analysis (DTA), and x-ray diffraction (XRD), for example.

Using optical microscopy, amorphous material is typically predominantly transparent due to the lack of light scattering centers such as crystal boundaries, while crystalline material shows a crystalline structure and is opaque due to light scattering effects.

A percent amorphous (or glass) yield can be calculated for particles (e.g., beads), etc. using a −100+120 mesh size fraction (i.e., the fraction collected between 150-micrometer opening size and 125-micrometer opening size screens). The measurements are done in the following manner. A single layer of particles, beads, etc. is spread out upon a glass slide. The particles, beads, etc. are observed using an optical microscope. Using the crosshairs in the optical microscope eyepiece as a guide, particles, beads, etc. that lay along a straight line are counted either amorphous or crystalline depending on their optical clarity (i.e., amorphous if they were clear). A total of 500 particles, beads, etc. are typically counted, although fewer particles, beads, etc. may be used and a percent amorphous yield is determined by the amount of amorphous particles, beads, etc. divided by total particles, beads, etc. counted. Embodiments of methods according to the present invention have percent amorphous (or glass) yields of at least 50, 60, 70, 75, 80, 85, 90, 95, or even 100 percent.

If it is desired for all the particles to be amorphous (or glass), and the resulting yield is less than 100%, the amorphous (or glass) particles may be separated from the non-amorphous (or non-glass) particles. Such separation may be done, for example, by any conventional techniques, including separating based upon density or optical clarity.

Using DTA, the material is classified as amorphous if the corresponding DTA trace of the material contains an exothermic crystallization event ($T_x$). If the same trace also contains an endothermic event ($T_g$) at a temperature lower than $T_x$ it is considered to include a glass phase. If the DTA trace of the material contains no such events, it is considered to contain crystalline phases.

Differential thermal analysis (DTA) can be conducted using the following method. DTA runs can be made (using an instrument such as that obtained from Netzsch Instruments, Selb, Germany under the trade designation "NETZSCH STA 409 DTA/TGA") using a −140+170 mesh size fraction (i.e., the fraction collected between 105-micrometer opening size and 90-micrometer opening size screens). An amount of each screened sample (typically about 400 milligrams (mg)) is placed in a 100-microliter $Al_2O_3$ sample holder. Each sample is heated in static air at a rate of 10° C./minute from room temperature (about 25° C.) to 1100° C.

Using powder x-ray diffraction, XRD, (using an x-ray diffractometer such as that obtained under the trade designation "PHILLIPS XRG 3100" from Phillips, Mahwah, N.J., with copper K α1 radiation of 1.54050 Angstrom) the phases present in a material can be determined by comparing the peaks present in the XRD trace of the crystallized material to XRD patterns of crystalline phases provided in JCPDS (Joint Committee on Powder Diffraction Standards) databases, published by International Center for Diffraction Data. Furthermore, XRD can be used qualitatively to determine types of phases. The presence of a broad diffuse intensity peak is taken as an indication of the amorphous nature of a material. The existence of both a broad peak and well-defined peaks is taken as an indication of existence of crystalline matter within a glass matrix.

The initially formed glass or ceramic (including glass prior to crystallization) may be larger in size than that desired. If the glass is in a desired geometric shape and/or size, size reduction is typically not needed. The glass or ceramic can be converted into smaller pieces using crushing and/or comminuting techniques known in the art, including roll crushing, jaw crushing, hammer milling, ball milling, jet milling, impact crushing, and the like. In some instances, it is desired to have two or multiple crushing steps. For example, after the ceramic is formed (solidified), it may be in the form of larger than desired. The first crushing step may involve crushing these relatively large masses or "chunks" to form smaller pieces. This crushing of these chunks may be accomplished with a hammer mill, impact crusher or jaw crusher. These smaller pieces may then be subsequently crushed to produce the desired particle size distribution. In order to produce the desired particle size distribution (sometimes referred to as grit size or grade), it may be necessary to perform multiple crushing steps. In general the crushing conditions are optimized to achieve the desired particle shape(s) and particle size distribution. Resulting particles that are not of the desired size may be re-crushed if they are too large, or "recycled" and used as a raw material for re-melting if they are too small.

The shape of particles can depend, for example, on the composition and/or microstructure of the ceramic, the geometry in which it was cooled, and the manner in which the ceramic is crushed (i.e., the crushing technique used). In general, where a "blocky" shape is preferred, more energy may be employed to achieve this shape. Conversely, where a "sharp" shape is preferred, less energy may be employed to achieve this shape. The crushing technique may also be changed to achieve different desired shapes. For some particles an average aspect ratio ranging from 1:1 to 5:1 is typically desired, and in some embodiments, 1.25:1 to 3:1, or even 1.5:1 to 2.5:1.

It is also within the scope of the present invention, for example, to directly form articles in desired shapes. For example, desired articles may be formed (including molded) by pouring or forming the melt into a mold. Also see, for example, the forming techniques described in application having U.S. Ser. No. 10/358,772, filed Feb. 5, 2003, the disclosure of which is incorporated herein by reference.

Embodiments of glasses and glass-ceramics made according to the present invention can be obtained without limitations in dimensions. This was found to be possible through a coalescing step performed at a temperature above the glass transition temperature. This coalescing step in essence forms a larger sized body from two or more smaller particles. For instance, a glass undergoes glass transition ($T_g$) before significant crystallization occurs ($T_x$) as evidenced by the existence of an endotherm ($T_g$) at lower temperature than an exotherm ($T_x$). For example, ceramic (including glass prior to crystallization), may also be provided by heating, for example, particles comprising the glass, and/or fibers, etc. above the $T_g$ such that the particles, etc. coalesce to form a shape. The temperature and pressure used for coalescing may depend, for example, upon composition of the glass and the desired density of the resulting material. The temperature should be greater than the glass transition temperature. In certain embodiments, the heating is conducted at at least one temperature in a range of about 700° C. to about 1100° C. (in some embodiments, 725° C. to 850° C.). Typically, the glass is under pressure (e.g., greater than zero to 1 GPa or more) during coalescence to aid the coalescence of the glass. In one embodiment, a charge of the particles, etc. is placed into a die and hot-pressing is performed at temperatures above glass transition where viscous flow of glass leads to coalescence into a relatively large part. Examples of typical coalescing techniques include hot pressing, hot isostatic pressing, hot extrusion, hot forging and the like (e.g., sintering, plasma assisted sintering). For example, particles comprising glass (obtained, for example, by crushing) (including beads and microspheres), fibers, etc. may formed into a larger particle size. Coalescing may also result in a body shaped into a desired form. In some embodiments, it is desirable to cool the resulting coalesced body before further heat treatment. After heat treatment if so desired, the coalesced body may be crushed to smaller particle sizes or a desired particle size distribution.

In general, heat-treatment can be carried out in any of a variety of ways, including those known in the art for heat-treating glass to provide glass-ceramics. For example, heat-treatment can be conducted in batches, for example, using resistive, inductively or gas heated furnaces. Alternatively, for example, heat-treatment (or a portion thereof) can be conducted continuously, for example, using a rotary kiln, fluidized bed furnaces, or pendulum kiln. In the case of a rotary kiln or a pendulum kiln, the material is typically fed directly into the kiln operating at the elevated temperature. In the case of a fluidized bed furnace, the glass to be heat-treated is typically suspended in a gas (e.g., air, inert, or reducing gasses). The time at the elevated temperature may range from a few seconds (in some embodiments, even less than 5 seconds) to a few minutes to several hours. The temperature typically ranges from the $T_x$ of the glass to 1600° C., more typically from 800° C. to 1600° C., and in some embodiments, from 1200° C. to 1500° C. It is also within the scope of the present invention to perform some of the heat-treatment in multiple steps (e.g., one for nucleation, and another for crystal growth; wherein densification also typically occurs during the crystal growth step). When a multiple step heat-treatment is carried out, it is typically desired to control either or both the nucleation and the crystal growth rates. In general, during most ceramic processing operations, it is desired to obtain maximum densification without significant crystal growth. Although not wanting to be bound by theory, in general, it is believed in the ceramic art that larger crystal sizes lead to reduced mechanical properties while finer average crystallite sizes lead to improved mechanical properties (e.g., higher strength and higher hardness). In particular, it is very desirable to form ceramics with densities of at least 90, 95, 97, 98, 99, or even 100 percent of theoretical density, wherein the average crystal sizes are less than 0.15 micrometer, or even less than 0.1 micrometer.

In some embodiments of the present invention, the glasses or ceramics comprising glass may be annealed prior to heat-treatment. In such cases annealing is typically done at a temperature less than the $T_x$ of the glass for a time from a few second to few hours or even days. Typically, the annealing is done for a period of less than 3 hours, or even less than an hour. Optionally, annealing may also be carried out in atmospheres other than air. Furthermore, different stages (i.e., the nucleation step and the crystal growth step) of the heat-treatment may be carried out under different atmospheres. It is believed that the $T_g$ and $T_x$, as well as the $T_x$-$T_g$ of the glasses may shift depending on the atmospheres used during the heat treatment.

One skilled in the art can determine the appropriate conditions from a Time-Temperature-Transformation (TTT) study of the glass using techniques known in the art. One skilled in the art, after reading the disclosure of the present invention should be able to provide TTT curves for glasses used to make glass-ceramics according to the present invention, determine the appropriate nucleation and/or crystal growth conditions to provide glass-ceramics according to the present invention.

Heat-treatment may occur, for example, by feeding the material directly into a furnace at the elevated temperature. Alternatively, for example, the material may be fed into a furnace at a much lower temperature (e.g., room temperature) and then heated to desired temperature at a predetermined heating rate. It is within the scope of the present invention to conduct heat-treatment in an atmosphere other than air. In some cases it might be even desirable to heat-treat in a reducing atmosphere(s). Also, for, example, it may be desirable to heat-treat under gas pressure as in, for example, a hot-isostatic press, or in a gas pressure furnace. Although not wanting to be bound by theory, it is believed that atmospheres may affect oxidation states of some of the components of the glasses and glass-ceramics. Such variation in oxidation states can bring about varying coloration of glasses and glass-ceramics. In addition, nucleation and crystallization steps can be affected by atmospheres (e.g., the atmosphere may affect the atomic mobilities of some species of the glasses).

It is also within the scope of the present invention to conduct additional heat-treatment to further improve desirable properties of the material. For example, hot-isostatic pressing may be conducted (e.g., at temperatures from about 800° C. to about 1400° C.) to remove residual porosity, increasing the density of the material. It is within the scope of the present invention to convert (e.g., crush) the resulting article or heat-treated article to provide particles (e.g., abrasive particles) made according to the present invention.

Typically, glass-ceramics are stronger than the glasses from which they are formed. Hence, the strength of the material may be adjusted, for example, by the degree to which the glass is converted to crystalline ceramic phase(s). Alternatively, or in addition, the strength of the material may also be affected, for example, by the number of nucleation sites created, which may in turn be used to affect the number, and in turn the size of the crystals of the crystalline phase(s). For additional details regarding forming glass-ceramics, see, for example, *Glass-Ceramics*, P. W. McMillan, Academic Press, Inc., $2^{nd}$ edition, 1979.

As compared to many other types of ceramic processing (e.g., sintering of a calcined material to a dense, sintered ceramic material), there is relatively little shrinkage (typically, less than 30 percent by volume; in some embodiments, less than 20 percent, 10 percent, 5 percent, or even less than 3 percent by volume) during crystallization of the glass to form the glass-ceramic. The actual amount of shrinkage depends, for example, on the composition of the glass, the heat-treatment time, the heat-treatment temperature, the heat-treatment pressure, the density of the glass being crystallized, the relative amount(s) of the crystalline phases formed, and the degree of crystallization. The amount of shrinkage can be measured by conventional techniques known in the art, including by dilatometry, Archimedes method, or measuring the dimensions of the material before and after heat-treatment. In some cases, there may be some evolution of volatile species during heat-treatment.

In some embodiments, the relatively low shrinkage feature may be particularly advantageous. For example, articles may be formed in the glass phase to the desired shapes and dimensions (i.e., in near-net shape), followed by heat treatment to at least partially crystallize the glass. As a result, substantial cost savings associated with the manufacturing and machining of the crystallized material may be realized.

In some embodiments, the glass has an x, y, z direction, each of which has a length of at least 1 cm (in some embodiments, at least 5 cm, or even at least 10 cm), wherein the glass has a volume, wherein the resulting glass-ceramic has an x, y, z direction, each of which has a length of at least 1 cm (in some embodiments, at least 5 cm, or even at least 10 cm), wherein the glass-ceramic has a volume of at least 70 (in some embodiments, at least 75, 80, 85, 90, 95, 96, or even at least 97) percent of the glass volume.

Examples of crystalline phases which may be present in glass-ceramics made according to the present invention include: alumina (e.g., alpha and transition aluminas), REO (e.g., $La_2O_3$), $Y_2O_3$, MgO, one or more other metal oxides such as BaO, CaO, $Cr_2O_3$, CoO, $Fe_2O_3$, $GeO_2$, $Li_2O$, MnO, NiO, $Na_2O$, $P_2O_5$, $Sc_2O_3$, $SiO_2$, SrO, $TeO_2$, $TiO_2$, $V_2O_5$, ZnO, $HfO_2$, $ZrO_2$ (e.g., cubic $ZrO_2$ and tetragonal $ZrO_2$), as well as "complex metal oxides" (including complex $Al_2O_3$.metal oxide (e.g., complex $Al_2O_3$.REO (e.g., $ReAlO_3$ (e.g., $GdAlO_3$, $LaAlO_3$), $ReAl_{11}O_{18}$ (e.g., $LaAl_{11}O_{18}$), and $Re_3Al_5O_{12}$ (e.g., $Dy_3Al_5O_{12}$)), and complex $Al_2O_3$.$Y_2O_3$ (e.g., $Y_3Al_5O_{12}$)), complex $ZrO_2$.REO (e.g., $La_2Zr_2O_7$)), complex $ZrO_2$.$Nb_2O_5$, complex $ZrO_2$.$Ta_2O_5$, complex $Y_2O_3$.$Nb_2O_5$, complex $Y_2O_3$.$Ta_2O_5$, complex $Al_2O_3$.$Nb_2O_5$, complex $Al_2O_3$.$Ta_2O_5$, and combinations thereof. Typically, ceramics according to the present invention are free of eutectic microstructure features.

It is also with in the scope of the present invention to substitute a portion of the aluminum cations in a complex $Al_2O_3$.metal oxide (e.g., complex $Al_2O_3$.REO and/or complex $Al_2O_3$.$Y_2O_3$ (e.g., yttrium aluminate exhibiting a garnet crystal structure)) with other cations. For example, a portion of the Al cations in a complex $Al_2O_3$.$Y_2O_3$ may be substituted with at least one cation of an element selected from the group consisting of: Cr, Ti, Sc, Fe, Mg, Ca, Si, Co, and combinations thereof. For example, a portion of the Y cations in a complex $Al_2O_3$.$Y_2O_3$ may be substituted with at least one cation of an element selected from the group consisting of: Ce, Dy, Er, Eu, Gd, Ho, La, Lu, Nd, Pr, Sm, Th, Tm, Yb, Fe, Ti, Mn, V, Cr, Co, Ni, Cu, Mg, Ca, Sr, and combinations thereof. Further, for example, a portion of the rare earth cations in a complex $Al_2O_3$.REO may be substituted with at least one cation of an element selected from the group consisting of: Y, Fe, Ti, Mn, V, Cr, Co, Ni, Cu, Mg, Ca, Sr, and combinations thereof. The substitution of cations as described above may affect the properties (e.g. hardness, toughness, strength, thermal conductivity, etc.) of the ceramic.

Crystals formed by heat-treating amorphous material to provide embodiments of glass-ceramics made according to the present invention may be, for example, acicular equiaxed, columnar, or flattened splat-like features.

Although the glass or glass-ceramic may be in the form of a bulk material, it is also within the scope of the present invention to provide composites comprising glass and/or glass-ceramic made according to the present invention. Such a composite may comprise, for example, a phase or fibers (continuous or discontinuous) or particles (including whiskers) (e.g., metal oxide particles, boride particles, carbide particles, nitride particles, diamond particles, metallic particles, glass particles, and combinations thereof) dispersed in glass-ceramic made according to the present invention, or a layered-composite structure (e.g., a gradient of glass-ceramic to glass used to make the glass-ceramic and/or layers of different compositions of glass-ceramics).

Certain glasses used to make the glass-ceramics may have, for example, a $T_g$ in a range of about 700° C. to about 850° C., or even higher temperatures.

In some embodiments, the glass or glass-ceramic according to the present invention does not comprise (in some embodiments, does not consist essentially of) 35.73 (in some embodiments, about 35 or 36; in some embodiments, in a range from 35 to 36, 34 to 36, or 34 to 37) percent by weight $Al_2O_3$, 42.17 (in some embodiments, about 42; in some embodiments, in a range from 42 to 43 or 41 to 43) percent by weight $Y_2O_3$ (in some embodiments, $Y_2O_3$ and/or (including collectively) REO), 17.1 (in some embodiments, about 17; in some embodiments, in a range from 17 to 18 or 16 to 18) percent by weight $ZrO_2$ (in some embodiments, $ZrO_2$ and/or (including collectively) $HfO_2$), and 5 (in some embodiments, about 5; in some embodiments, in a range from 4 to 6) percent by weight $Nb_2O_5$ and/or (including collectively) $Ta_2O_5$, based on the total weight of the glass or glass-ceramic, respectively.

In some embodiments of glasses and glass-ceramics according to the present invention, if the glass or glass-ceramic comprises $Al_2O_3$ (in some embodiments, 35.73 percent by weight $Al_2O_3$; in some embodiments, about 35 or 36 percent by weight $Al_2O_3$; in some embodiments, in a range from 35 to 36, 34 to 36, or 34 to 37 percent by weight $Al_2O_3$), $Y_2O_3$ (in some embodiments, $Y_2O_3$ and/or (including collectively) REO) (in some embodiments, 42.17 percent by weight $Y_2O_3$ (in some embodiments, $Y_2O_3$ and/or (including collectively) REO); in some embodiments, about 42 percent by weight $La_2O_3$ (in some embodiments, $Y_2O_3$ and/or (including collectively) REO); in some embodiments, in a range from 42 to 43 or 41 to 43) percent by weight $La_2O_3$ (in some embodiments, $Y_2O_3$ and/or (including collectively) REO), and $ZrO_2$ (in some embodiments, $ZrO_2$ and/or (including collectively) $HfO_2$) (in some embodiments, 17.1 percent by weight $ZrO_2$ (in some embodiments, at least one of $ZrO_2$ or $HfO_2$); in some embodiments, about 17 percent by weight $ZrO_2$ (in some embodiments, at least one of $ZrO_2$ or $HfO_2$); in some embodiments, in a range from 17 to 18 or 16 to 18) percent by weight $ZrO_2$ (in some embodiments, at least one of $ZrO_2$ or $HfO_2$) are present, the glass or glass-ceramic comprises either less than or greater than 5 (in some embodiments, not about 5, less than 5, or greater than 5; in some embodiments, not greater than 4, 3, 2, or 1 or at least 6, 7, 8, 9, 10, 15, 20, 25, 30, 35, 40, 45, 50, 55, 60, 65, 70, 75, or even at least 80) percent by weight of the at least one of $Nb_2O_5$ or $Ta_2O_5$, based on the total weight of the glass or glass-ceramic, respectively.

Typically, and desirably, the (true) density, sometimes referred to as specific gravity, of glass-ceramics made according to the present invention, and glasses used to make such glass-ceramics, is typically at least 70% of theoretical density. More desirably, the (true) density of glass-ceramics made according to the present invention, and glasses used to make such glass-ceramics is at least 75%, 80%, 85%, 90%, 95%, 96%, 97%, 98%, 99%, 99.5%, or even 100% of theoretical density. Abrasive particles made according to the present invention have densities of at least 85%, 90%, 92%, 95%, 96%, 97%, 98%, 99%, 99.5%, or even 100% of theoretical density.

Articles can be made using glass-ceramics made according to the present invention, for example, as a filler, reinforcement material, and/or matrix material. For example, glass-ceramic made according to the present invention can be in the form of particles and/or fibers suitable for use as reinforcing materials in composites (e.g., ceramic, metal, or polymeric (thermosetting or thermoplastic)). The particles and/or fibers may, for example, increase the modulus, heat resistance, wear resistance, and/or strength of the matrix material. Although the size, shape, and amount of the particles and/or fibers used to make a composite may depend, for example, on the particular matrix material and use of the composite, the size of the reinforcing particles typically range from about 0.1 to 1500 micrometers, more typically 1 to 500 micrometers, and desirably between 2 to 100 micrometers. The amount of particles for polymeric applications is typically about 0.5 percent to about 75 percent by weight, more typically about 1 to about 50 percent by weight. Examples of thermosetting polymers include: phenolic, melamine, urea formaldehyde, acrylate, epoxy, urethane polymers, and the like. Examples of thermoplastic polymers include: nylon, polyethylene, polypropylene, polyurethane, polyester, polyamides, and the like.

Examples of uses for reinforced polymeric materials (i.e., reinforcing particles made according to the present invention dispersed in a polymer) include protective coatings, for example, for concrete, furniture, floors, roadways, wood, wood-like materials, ceramics, and the like, as well as, anti-skid coatings and injection molded plastic parts and components.

Further, for example, glass-ceramic made according to the present invention can be used as a matrix material. For example, glass-ceramics made according to the present invention can be used as a binder for ceramic materials and the like such as diamond, cubic-BN, $Al_2O_3$, $ZrO_2$, $Si_3N_4$, and SiC. Examples of useful articles comprising such materials include composite substrate coatings, cutting tool inserts abrasive agglomerates, and bonded abrasive articles such as vitrified wheels. The glass-ceramics made according to the present invention can be used as binders, for example, to increase the modulus, heat resistance, wear resistance, and/or strength of the composite article.

Optical waveguides according to the present invention may be made generally by fabrication means known to one of ordinary skill in the art. For example, a channel waveguide (see FIG. 2) may be fabricated by depositing a doped glass layer on a low-index cladding, followed by photo-lithography and etching to define a line. The lithography is usually followed by the deposition of a low index top cladding. A ridge waveguide (see FIG. 3) is similar to a channel waveguide except that the doped glass layer is not fully etched back. A strip-loaded waveguide (see FIG. 4) may be made by placing a strip, of low-index cladding on a planar layer of doped glass. A diffused waveguide (see FIG. 5) may be made by indiffusing a doped glass into the low-index substrate. The doped glasses may be deposited onto a low index layer or cladding by known methods in the art such as sputtering and followed by photolithography to define lines or ridges. Alternatively, the doped glasses may be deposited onto a low index layer or cladding by known methods in the art such as sputtering and then the doped glass layer may be covered by a low index layer (see FIG. 6). Glass fibers using the doped glasses described herein as the core of the fibers may be fabricated by well known methods, such as reported in "Rare earth doped fiber lasers and amplifiers", Ed., M. J. F. Digonnet, 1993, Marcel Dekker, Inc. and in U.S. Pat. No. 6,484,539 B1 (Nordine et al.) and U.S. Pat. No. 6,490,081 B1 (Feillens et al.).

Certain glass-ceramic particles made according to the present invention can be particularly useful as abrasive particles. The abrasive particles can be incorporated into an abrasive article, or used in loose form. Abrasive particles made according to the present invention generally comprise crystalline ceramic (e.g., at least 75, 80, 85, 90, 91, 92, 93, 94, 95, 96, 97, 98, 99, 99.5, or even 100 percent by volume crystalline ceramic). In another aspect, the present invention provides a plurality of particles having a particle size distribution ranging from fine to coarse, wherein at least a portion of the plurality of particles are abrasive particles made according to the present invention. In another aspect, embodiments of abrasive particles made according to the present invention generally comprise (e.g., at least 75, 80, 85, 90, 91, 92, 93, 94, 95, 96, 97, 98, 99, 99.5, or even 100 percent by volume) glass-ceramic made according to the present invention.

Abrasive particles are usually graded to a given particle size distribution before use. Such distributions typically have a range of particle sizes, from coarse particles to fine particles. In the abrasive art this range is sometimes referred to as a "coarse", "control" and "fine" fractions. Abrasive particles graded according to industry accepted grading standards specify the particle size distribution for each nominal grade within numerical limits. Such industry accepted grading standards (i.e., specified nominal grades) include those known as the American National Standards Institute, Inc. (ANSI) standards, Federation of European Producers of Abrasive Products (FEPA) standards, and Japanese Industrial Standard (JIS) standards. In one aspect, the present invention provides a plurality of abrasive particles having a specified nominal grade, wherein at least a portion of the plurality of abrasive particles are abrasive particles made according to the present invention. In some embodiments, at least 5, 10, 15, 20, 25, 30, 35, 40, 45, 50, 55, 60, 65, 70, 75, 80, 85, 90, 95, or even 100 percent by weight of the plurality of abrasive particles are the abrasive particles made according to the present invention, based on the total weight of the plurality of abrasive particles.

In another aspect, the present invention provides an abrasive article (e.g., a bonded abrasive article, a non-woven abrasive article, or a coated abrasive article) comprising a binder and a plurality of abrasive particles, wherein at least a portion of the abrasive particles are the abrasive particles made according to the present invention.

In some embodiments, the present invention provides a method for making abrasive particles, the method comprising heat-treating glass particles to convert at least a portion of the glass to glass-ceramic and provide the abrasive particles. In some embodiments, the method further comprises grading the abrasive particles to provide a plurality of particles having a specified nominal grade. In some embodiments, the method further comprises incorporating the abrasive particles into an abrasive article.

Abrasive articles comprise binder and a plurality of abrasive particles, wherein at least a portion of the abrasive particles are the abrasive particles made according to the present invention. Exemplary abrasive products include coated abrasive articles, bonded abrasive articles (e.g., wheels), non-woven abrasive articles, and abrasive brushes. Coated abrasive articles typically comprise a backing having first and second, opposed major surfaces, and wherein the binder and the plurality of abrasive particles form an abrasive layer on at least a portion of the first major surface.

In some embodiments, at least 5, 10, 15, 20, 25, 30, 35, 40, 45, 50, 55, 60, 65, 70, 75, 80, 85, 90, 95, or even 100 percent by weight of the abrasive particles in an abrasive article are the abrasive particles made according to the present invention, based on the total weight of the abrasive particles in the abrasive article.

Additional details regarding embodiments of ceramics (including methods of making and using the same) comprising at least $Al_2O_3$, REO, and at least one of $Nb_2O_5$ or $Ta_2O_5$ may be found, for example, in application having U.S. Ser. No. 10/666,615, filed the same date as the instant application, the disclosure of which is incorporated herein by reference. Additional details regarding embodiments of ceramics (including methods of making and using the same) comprising at least two of (a) $Al_2O_3$, (b) REO, or (c) at least one of $ZrO_2$ or $HfO_2$, and at least one of $Nb_2O_5$ or $Ta_2O_5$ may be found, for example, in application having U.S. Ser. No. 10/666212, filed the same date as the instant application, the disclosure of which is incorporated herein by reference.

Advantages and embodiments of this invention are further illustrated by the following non-limiting examples, but the particular materials and amounts thereof recited in these examples, as well as other conditions and details, should not be construed to unduly limit this invention. All parts and percentages are by weight unless otherwise indicated. Unless otherwise stated, all examples contained no significant amount of $SiO_2$, $B_2O_3$, $P_2O_5$, $GeO_2$, $TeO_2$, $As_2O_3$, and $V_2O_5$.

EXAMPLES 1–14

A polyethylene bottle was charged with 100 grams of the components listed in Table 1, below. The sources of the raw materials used are listed in Table 2, below. The $Er_2O_3$ source was $Er(NO_3).5H_2O$, and the amount used took into account an oxide yield of about 43 wt. %.

TABLE 1

| Example | Wt. % $Y_2O_3$ | Wt. % $Al_2O_3$ | Wt. % $ZrO_2$ | Wt. % $Nb_2O_5$ | Wt. % $Ta_2O_5$ | Wt. % $Er_2O_3$ | Glass Yield Vol. % |
|---|---|---|---|---|---|---|---|
| 1 | 15.68 | 8.9 | | 73.83 | | 1.58 | >95 |
| 2 | 39.26 | 5.94 | | 53.27 | | 1.52 | >95 |
| 3 | 15.07 | 46.5 | | 36.96 | | 1.46 | >95 |
| 4 | 10.53 | 5.98 | | | 82.48 | 0.99 | >95 |
| 5 | 29.05 | 4.4 | | | 65.53 | 1 | >95 |
| 6 | 12.12 | 37.42 | | | 49.44 | 1 | >95 |
| 7 | 49.38 | | 14.47 | | 35.15 | 1 | >60 |
| 8 | 55.24 | | 12.18 | 31.58 | | 1 | >70 |
| 9 | | 34.24 | 27.58 | 37.18 | | 1 | >95 |
| 10 | | 9.87 | 11.92 | 77.19 | | 1 | >75 |
| 11 | | 8.22 | 26.49 | 64.28 | | 1 | >85 |
| 12 | | 27.41 | 22.08 | 49.49 | | 1 | >90 |
| 13 | | 6.50 | 7.86 | 84.59 | | 1 | >50 |
| 14 | | 5.74 | 18.52 | 74.72 | | 1 | >75 |

TABLE 2

| Raw Material | Source |
|---|---|
| Alumina ($Al_2O_3$) powder | Obtained from Condea Vista, Tucson, AZ under the trade designation "APA-0.5" |
| Erbium Nitrate Pentahydrate ($ErNO_3.5H_2O$) | Obtained from Aldrich Chemical, Milwaukee, WI |
| Yttrium Oxide ($Y_2O_3$) powder | Obtained from Molycorp Inc., Mountain Pass, CA |
| Tantalum Oxide ($Ta_2O_5$) powder | Obtained from Aldrich Chemical |
| Niobium Oxide ($Nb_2O_5$) powder | Obtained from Aldrich Chemical |
| Zirconium Oxide ($ZrO_2$) powder | Obtained under the trade designation "DK-1" from Zirconia Sales, Inc. of Marietta, GA |

For each example, about 400 grams of zirconia milling media (obtained from Tosoh Ceramics, Division of Bound Brook, N.J. under the trade designation "YTZ") were added to the bottle along with 100 ml distilled and deionized water. The mixture was milled for 24 hours at 120 rpm. After the milling, the milling media were removed and the slurry was poured onto a glass ("PYREX") pan where it was dried using a heat-gun. Before melting in a flame, dried particles were calcined at 1300° C. for 1 hour in air in an electrically heated furnace (obtained under the trade designation "Model KKSK-666-3100" from Keith Furnaces of Pico Rivera, Calif.). After grinding with a mortar and pestle, a portion of the calcined particles were fed into a hydrogen/oxygen torch flame. The hydrogen torch used to melt the multiphase particles, thereby generating a melted glass bead, was a Bethlehem bench burner (PM2D Model B obtained from Bethlehem Apparatus Co., Hellertown, Pa.). For the inner ring, the hydrogen flow rate was 8 standard liters per minute (SLPM), the oxygen flow rate was 3 SLPM. For the outer ring, the hydrogen flow rate was 23 standard liters per minute (SLPM), the oxygen flow rate was 9.8 SLPM. The dried and sized particles were fed directly into the hydrogen torch flame, where they were melted and transported to an inclined stainless steel surface (approximately 20 inches wide with the slope angle of 45 degrees) with cold water running over (approximately 8 l/min.).

The resulting molten and quenched particles were collected in a pan and dried at 110° C. The particles were spherical in shape and varied in size from a few tens of micrometers up to 250 micrometers.

A percent amorphous yield was calculated from the resulting flame-formed beads using a −100+120 mesh size fraction (i.e., the fraction collected between 150-micrometer opening size and 125-micrometer opening size screens). The measurements were done in the following manner. A single layer of beads was spread out upon a glass slide. The beads were observed using an optical microscope. Using the crosshairs in the optical microscope eyepiece as a guide, beads that lay horizontally coincident with the crosshair along a straight line were counted either amorphous or crystalline depending on their optical clarity (i.e., they were amorphous if clear). A total of 500 beads were counted and a percent amorphous yield was determined by the amount of amorphous beads divided by total beads counted. The amorphous yield data for the flame formed beads of Examples 1–14 are reported in Table 1, above.

EXAMPLES 15 AND 16

Portions of beads of Example 1 and 4 were heat-treated in a furnace (an electrically heated furnace (obtained under the trade designation "Model KKSK-666-3100" from Keith Furnaces of Pico Rivera, Calif.)) as follows to provide Examples 15 and 16, respectively. The beads were heated from room temperature (about 25° C.) to about 1300° C. at a rate of about 10° C./min. and then held at 1300° C. for about 1 hour. Next, the beads were cooled back to room temperature by turning off the furnace.

Figure 8:
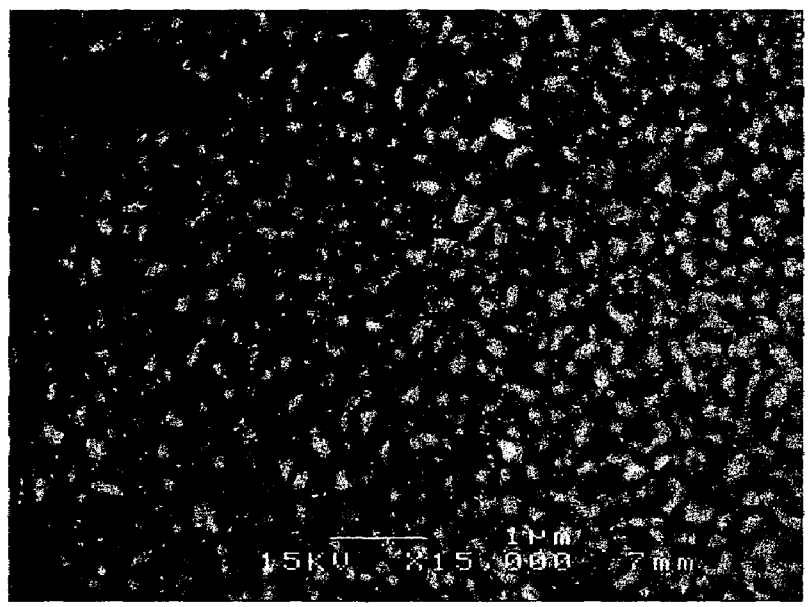
FIGS. 8 and 9 are scanning electron microscope (SEM) digital photomicrographs of Example 15 and 16 materials, respectively.
Figure 9:
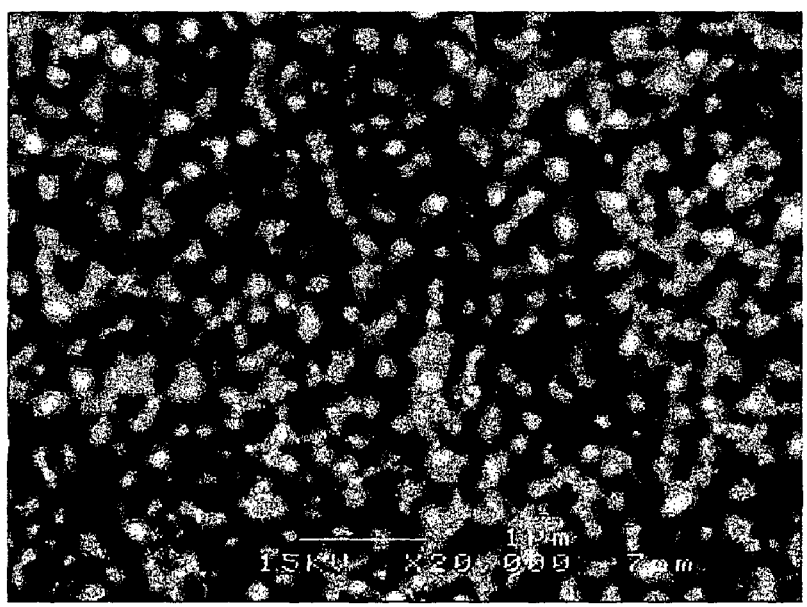

FIGS. 8 and 9 are scanning electron microscope (SEM) digital photomicrographs at 15,000× and 20,000×, respectively, of polished sections of heat-treated Example 1and 4 materials showing the crystalline nature of the materials. The polished sections were prepared using conventional mounting and polishing techniques. Polishing was done using a polisher (obtained from Buehler of Lake Bluff, Ill. under the trade designation "ECOMET 3 TYPE POLISHER-GRINDER"). The samples were polished for about 3 minutes with a diamond wheel containing 125-micrometer diamonds, followed by three minutes of polishing with each of 45, 30, 15, 9, and 3 micrometers diamond slurries. The polished samples were coated with a thin layer of gold-palladium and viewed using JEOL SEM (Model JSM 840A).

Various modifications and alterations of this invention will become apparent to those skilled in the art without departing from the scope and spirit of this invention, and it should be understood that this invention is not to be unduly limited to the illustrative embodiments set forth herein.

What is claimed is:

1. Glass collectively comprising at least 70 percent by weight of (i) at least one of $Nb_2O_5$ or $Ta_2O_5$ and (ii) at least two of (a) $Al_2O_3$, (b) $Y_2O_3$, or (c) at least one of $ZrO_2$ or $HfO_2$, and the glass containing not more than 30 percent by weight collectively $As_2O_3$, $B_2O_3$, $GeO_2$, $P_2O_5$, $SiO_2$, $TeO_2$, and $V_2O_5$, based on the total weight of the glass.

2. The glass according to claim 1, wherein if $Al_2O_3$, at least one of $Y_2O_3$ or REO, and at least one of $ZrO_2$ or $HfO_2$ are present, the glass comprises either not greater than 4 or at least 6 percent by weight of the at least one of $Nb_2O_5$ or $Ta_2O_5$, based on the total weight of the glass.

3. The glass according to claim 1, wherein if $Al_2O_3$, at least one of $Y_2O_3$ or REO, and at least one of $ZrO_2$ or $HfO_2$ are present, the glass comprises at least 6 percent by weight of the at least one of $Nb_2O_5$ or $Ta_2O_5$, based on the total weight of the glass.

4. The glass according to claim 3 collectively comprising at least 75 percent by weight of (i) at least one of $Nb_2O_5$ or $Ta_2O_5$ and (ii) at least two of (a) $Al_2O_3$, (b) $Y_2O_3$, or (c) at least one of $ZrO_2$ or $HfO_2$, based on the total weight of the glass.

5. The glass according to claim 3 collectively comprising at least 80 percent by weight of (i) at least one of $Nb_2O_5$ or $Ta_2O_5$ and (ii) at least two of (a) $Al_2O_3$, (b) $Y_2O_3$, or (c) at least one of $ZrO_2$ or $HfO_2$, based on the total weight of the glass.

6. The glass according to claim 3 collectively comprising at least 85 percent by weight of (i) at least one of $Nb_2O_5$ or $Ta_2O_5$ and (ii) at least two of (a) $Al_2O_3$, (b) $Y_2O_3$, or (c) at least one of $ZrO_2$ or $HfO_2$, based on the total weight of the glass.

7. The glass according to claim 3 collectively comprising at least 90 percent by weight of (i) at least one of $Nb_2O_5$ or $Ta_2O_5$ and (ii) at least two of (a) $Al_2O_3$, (b) $Y_2O_3$, or (c) at least one of $ZrO_2$ or $HfO_2$, based on the total weight of the glass.

8. The glass according to claim 3 collectively comprising at least 99 percent by weight of (i) at least one of $Nb_2O_5$ or $Ta_2O_5$ and (ii) at least two of (a) $Al_2O_3$, (b) $Y_2O_3$, or (c) at least one of $ZrO_2$ or $HfO_2$, based on the total weight of the glass.

9. The glass according to claim 3 collectively having 100 percent by weight of (i) at least one of $Nb_2O_5$ or $Ta_2O_5$ and (ii) at least two of (a) $Al_2O_3$, (b) $Y_2O_3$, or (c) at least one of $ZrO_2$ or $HfO_2$, based on the total weight of the glass.

10. The glass according to claim 3 collectively comprising at least 70 percent by weight of $Al_2O_3$, at least one of $ZrO_2$ or $HfO_2$, and at least one of $Nb_2O_5$ or $Ta_2O_5$, based on the total weight of the glass.

11. The glass according to claim 10, wherein the at least one of $ZrO_2$ or $HfO_2$ is present in an amount of at least 5 percent by weight, based on the total weight of the glass.

12. The glass according to claim 10, wherein the at least one of $ZrO_2$ or $HfO_2$ is present in an amount of at least 10 percent by weight, based on the total weight of the glass.

13. The glass according to claim 3 collectively comprising at least 70 percent by weight of $Al_2O_3$, $Y_2O_3$, and at least one of $Nb_2O_5$ or $Ta_2O_5$, based on the total weight of the glass.

14. The glass according to claim 3, wherein the at least one of $Nb_2O_5$ or $Ta_2O_5$ is present in an amount of at least 10 percent by weight, based on the total weight of the glass.

15. The glass according to claim 3 collectively comprising at least 70 percent by weight of $Y_2O_3$, at least one of $ZrO_2$ or $HfO_2$, and at least one of $Nb_2O_5$ or $Ta_2O_5$.

16. The glass according to claim 15, wherein the at least one of $Nb_2O_5$ or $Ta_2O_5$ is present in an amount greater than 5 percent by weight, based on the total weight of the glass.

17. The glass according to claim 15, wherein the at least one of $Nb_2O_5$ or $Ta_2O_5$, is present in an amount of at least 10 percent by weight, based on the total weight of the glass.

18. The glass according to claim 3 comprising greater than 5 percent by weight of the at least one of $Nb_2O_5$ or $Ta_2O_5$, based on the total weight of the glass.

19. The glass according to claim 3 comprising at least 10 percent by weight of the at least one of $Nb_2O_5$ or $Ta_2O_5$, based on the total weight of the glass.

20. The glass according to claim 3 comprising at least 15 percent by weight of the at least one of $Nb_2O_5$ or $Ta_2O_5$, based on the total weight of the glass.

21. The glass according to claim 3 comprising at least 20 percent by weight of the at least one of $Nb_2O_5$ or $Ta_2O_5$, based on the total weight of the glass.

22. The glass according to claim 3 comprising at least 25 percent by weight of the at least one of $Nb_2O_5$ or $Ta_2O_5$, based on the total weight of the glass.

23. The glass according to claim 3 comprising the at least one of $Nb_2O_5$, or $Ta_2O_5$, in a range from 10 to 40 percent by weight, based on the total weight of the glass.

24. The glass according to claim 3 collectively comprising at least 70 percent by weight of $Al_2O_3$, $Y_2O_3$, at least one of $ZrO_2$ or $HfO_2$, and at least one of $Nb_2O_5$ or $Ta_2O_5$, based on the total weight of the glass.

25. The glass according to claim 24, wherein the at least one of $ZrO_2$ or $HfO_2$ is present in an amount of at least 5 percent by weight, based on the total weight of the glass.

26. The glass according to claim 24, wherein the at least one of $ZrO_2$ or $HfO_2$ is present in an amount of at least 10 percent by weight, based on the total weight of the glass.

27. A method for making the glass according to claim 3, the method comprising:
melting sources of (i) at least one of $Nb_2O_5$, or $Ta_2O_5$ and (ii) at least two of (a) $Al_2O_3$, (b) $Y_2O_3$, or (c) at least one of $ZrO_2$ or $HfO_2$ to provide a melt; and
cooling the melt to provide the glass.

28. A method for making an article comprising glass according to claim 3, the method comprising:
providing glass powder comprising glass, the glass collectively comprising at least 70 percent by weight of (i) at least one of $Nb_2O_5$ or $Ta_2O_5$ and (ii) at least two of (a) $Al_2O_3$, (b) $Y_2O_3$, or (c) at least one of $ZrO_2$ or $HfO_2$, and the glass containing not more than 30 percent by weight collectively $As_2O_3$, $B_2O_3$, $GeO_2P_2O_5$, $SiO_2$, $TeO_2$, and $V_2O_5$, wherein if $Al_2O_3$, at least one of $Y_2O_3$ or REO, and at least one of $ZrO_2$ or $HfO_2$ are present, the glass comprises at least 6 percent by weight of the at least one of $Nb_2O_5$ or $Ta_2O_5$, based on the total weight of the glass, the glass having a $T_g$; and
heating the glass powder above the $T_3$ such that the glass beads coalesce to form a shape and provide the article.

29. An optical waveguide comprising:
a substrate; and
a glass according to claim 3 on a surface of the substrate.

30. The optical waveguide according to claim 29, wherein the glass is doped with a rare earth dopant.

31. The optical waveguide according to claim 30 wherein the rare earth dopant is selected from the group consisting of cerium, praseodymium, neodymium, promethium, samarium, europium, gadolinium, terbium, dysprosium, holmium, erbium, thulium, ytterbium, or their other compounds and mixtures thereof.

32. An optical waveguide comprising a glass fiber having a core material and a cladding surrounding the core material, wherein the core material comprises a glass according to claim 3.

33. The optical waveguide according to claim 32, wherein the glass is doped with a rare earth dopant.

34. The optical waveguide according to claim 33, wherein the rare earth dopant is selected from the group consisting of cerium, praseodymium, neodymium, promethium, samarium, europium, gadolinium, terbium, dysprosium, holmium, erbium, thulium, ytterbiarn, or their other compounds, and mixtures thereof.

35. An optical amplifier comprising:
an optical pump source which provides optical pump light; and
an optical waveguide coupled to receive the optical pump light from the optical pump source, wherein the optical waveguide comprises a glass according to claim 3.

36. The optical amplifier according to claim 35, wherein the glass is doped with a rare earth dopant.

37. The optical amplifier according to claim 36, wherein the rare earth dopant is selected from the group consisting of cerium, praseodymium, neodymium, promethium, samarium, europium, gadolinium, terbium, dysprosium, holmium, erbium, thulium, ytterbium, or their other compounds, and mixtures thereof.

38. The glass according to claims 1 in the form of an IR window.

39. The glass according to claim 1, wherein the glass collectively comprising at least 80 percent by weight of (i) at least one of $Nb_2O_5$ or $Ta_2O$ and (ii) at least two of (a) $Al_2O_3$, (b) $Y_2O_3$, or (c) at least one of $ZrO_2$ or $HfO_2$, and the glass containing not more than 20 percent by weight collectively $As_2O_3$, $B_2O_3$, $GeO_2P_2O_5$, $SiO_2$, $TeO_2$, and $V_2O_5$, based on the total weight of the glass.

40. The glass according to claim 1, wherein the glass collectively comprising at least 80 percent by weight of (i) at least one of $Nb_2O_5$ or $Ta_2O_5$, (ii) at least one of $ZrO_2$ or $HfO_2$, and (iii) at least one of $Al_2O_3$ or $Y_2O_3$, and the glass containing not more than 20 percent by weight collectively $As_2O_3$, $B_2O_3$, $GeO_2$, $P_2O_5$, $SiO_2$, $TeO_2$, and $V_2O_5$, based on the total weight of the glass.

41. The method according to claim 28, wherein the glass of the glass powder comprises at least one of $ZrO_2$ or $HfO_2$.

* * * * *

UNITED STATES PATENT AND TRADEMARK OFFICE
CERTIFICATE OF CORRECTION

| | |
|---|---|
| PATENT NO. | : 7,141,522 B2 |
| APPLICATION NO. | : 10/666098 |
| DATED | : November 28, 2006 |
| INVENTOR(S) | : Anatoly Z. Rosenflanz |

It is certified that error appears in the above-identified patent and that said Letters Patent is hereby corrected as shown below:

First Page, Column 1
Section (54), Title, delete "CERAMICS COMPRISING $AL_2O_3$, $Y_2O_3$, $ZRO_2$, AND/OR $HFO_2$, AND $NB_2O_5$ AND/OR $TA_2O_5$ AND METHODS OF MAKING THE SAME" and insert -- CERAMICS COMPRISING $Al_2O_3$, $Y_2O_3$, $ZrO_2$, AND/OR $HfO_2$, AND $Nb_2O_5$ AND/OR $Ta_2O_5$ AND METHODS OF MAKING THE SAME --

Page 3, Column 1
Line 29, after "6,461,988" delete "B1" and insert -- B2 --, therefor.
Line 35, after "6,511,739" delete "B1" and insert -- B2 --, therefor.
Line 48, after "6,749,653" delete "B1" and insert -- B2 --, therefor.
Under the Foreign Patent Documents, Line 2, before "134 638" delete "DE" and insert -- DD --, therefor.

Page 3, Column 2
Line 33, before "63-156024" delete "JP" and insert -- S --, therefor.
Line 40, before "63-303821" delete "JP" and insert -- S --, therefor.
Line 47, before "1455569" delete "RU" and insert -- SU --, therefor.

Page 4, Column 1
Line 19, delete "n" and insert -- no. --, therefor.
Line 24, delete "356–56," and insert -- 354–56, --, therefor.

Page 4, Column 2
Line 28, delete "$RE_3Al_5O_{12}$" and insert -- $Re_3Al_5O_{12}$ --, therefor.
Line 28, delete "$REAlO_3$" and insert -- $ReAlO_3$ --, therefor.
Line 56, delete "Equilibira" and insert -- Equilibria --, therefor.
Line 65, delete ""Fundamentsal" and insert -- "Fundamentals --, therefor.
Line 68, after "Waveguides" insert -- on --.

Page 5, Column 1
Line 17, delete "Spinal" and insert -- Spinel --, therefor.
Line 23, delete "Conference/" and insert -- Conferences/ --, therefor.
Line 69, delete "in" and insert -- In --, therefor.
Line 70, after "having" delete "a".

UNITED STATES PATENT AND TRADEMARK OFFICE
CERTIFICATE OF CORRECTION

PATENT NO. : 7,141,522 B2
APPLICATION NO. : 10/666098
DATED : November 28, 2006
INVENTOR(S) : Anatoly Z. Rosenflanz It is certified that error appears in the above-identified patent and that said Letters Patent is hereby corrected as shown below:

Page 5, Column 2
Line 7, delete "Pictures"," and insert -- Particles", --, therefor.
Line 58, after "2003" insert -- , --.
Line 60, after "2003" insert -- , --.
Line 61, delete "Fusad" and insert -- Fused --, therefor.
Line 62, after "2003" insert -- , --.
Line 65, after "2003" insert -- , --.
Line 67, after "2003" insert -- , --.
Line 69, after "2003" insert -- , --.
Line 69, delete "10/739,44" and insert -- 10/739,441 --, therefor.
Line 71, after "2003" insert -- , --.

Column 1
Lines 1-4, "CERAMICS COMPRISING $AL_2O_3$, $Y_2O_3$, $ZRO_2$, AND/OR $HFO_2$, AND $NB_2O_5$ AND/OR $TA_2O_5$ AND METHODS OF MAKING THE SAME" and insert -- CERAMICS COMPRISING $Al_2O_3$, $Y_2O_3$, $ZrO_2$, AND/OR $HfO_2$, AND $Nb_2O_5$ AND/OR $Ta_2O_5$ AND METHODS OF MAKING THE SAME --

Column 6
Line 61, after "$Y_3Al_5O_{12}$))" insert -- . --.

Column 7
Line 32, delete "oxide–other metal oxide" and insert -- oxide•other metal oxide --, therefor.

Column 18
Line 43, delete "strip," and insert -- strip --, therefor.

Column 20
Line 6, delete "10/666212," and insert -- 10/666,212, --, therefor.
Line 23, delete "$Er(NO_3).5H_2O$," and insert -- $Er(NO_3)$•$5H_2O$, --, therefor.
Line 31, delete "$Y_20_3$" and insert -- $Y_2O_3$ --, therefor.
Line 31, delete "$Al_20_3$" and insert -- $Al_2O_3$ --, therefor.
Line 52, delete "($ErNO_3.5H_2O$)" and insert -- ($ErNO_3$•$5H_2O$) --, therefor.

UNITED STATES PATENT AND TRADEMARK OFFICE
CERTIFICATE OF CORRECTION

PATENT NO. : 7,141,522 B2
APPLICATION NO. : 10/666098
DATED : November 28, 2006
INVENTOR(S) : Anatoly Z. Rosenflanz It is certified that error appears in the above-identified patent and that said Letters Patent is hereby corrected as shown below:

Column 21
Line 54, delete "15,000x" and insert -- 15,000X --, therefor.
Line 54, delete "20,000x," and insert -- 20,000X, --, therefor.
Line 55, delete "1and" and insert -- 1 and --, therefor.

Column 23
Line 11, in claim 17, delete "$Ta_2O_5$," and insert -- $Ta_2O_5$ --, therefor.
Line 29, in claim 23, delete "$Nb_2O_5$," and insert -- $Nb_2O_5$ --, therefor.
Line 43, in claim 27, delete "$Nb_2O_5$," and insert -- $Nb_2O_5$ --, therefor.
Line 54, in claim 28, delete "$GeO_2P_2O_5$," and insert -- $GeO_2$, $P_2O_5$, --, therefor.

Column 24
Line 1, in claim 28, delete "$T_3$" and insert -- $T_g$ --, therefor.
Line 24, in claim 34, delete "ytterbiarn," and insert -- ytterbium, --, therefor.
Line 47, in claim 39, delete "$GeO_2P_2O_5$," and insert -- $GeO_2$, $P_2O_5$, --, therefor.

Signed and Sealed this

Twenty-sixth Day of May, 2009

JOHN DOLL
*Acting Director of the United States Patent and Trademark Office*